May 8, 1962 C. STRACHEY 3,033,457
MULTIPLYING-DIVIDING ARRANGEMENTS FOR ELECTRONIC
DIGITAL COMPUTING MACHINES
Filed Jan. 15, 1957 8 Sheets-Sheet 4

3,033,457
MULTIPLYING-DIVIDING ARRANGEMENTS FOR ELECTRONIC DIGITAL COMPUTING MACHINES
Christopher Strachey, London, England, assignor, by mesne assignments, to International Business Machines Corporation, New York, N.Y., a corporation of New York
Filed Jan. 15, 1957, Ser. No. 634,222
Claims priority, application Great Britain Jan. 20, 1956
14 Claims. (Cl. 235—165)

This invention relates to electronic binary digital computers which operate wholly or mainly in the serial mode with number words in the form of electric pulse signal trains.

The object of the invention is to provide an improved apparatus arrangement by which a variety of forms of both multiplication and division of binary numbers may be effected, each under the control of a single order.

According to the invention, an apparatus arrangement for effecting either multiplication or division of binary numbers expressed in serial pulse train form comprises separate first and second word storage registers, each of the kind employing a word signal circulating path and each being provided with a signal controlled arithmetical circuit included in such circulation path by which either addition or subtraction of number-representing signal trains applied thereto may be made, each of such registers also having signal controlled means for altering the delay time of their respective circulation paths and each being complexly interconnected with one another through signal controlled transfer paths and being further connected through signal controlled external connections to external word storage means associated with the data storage system of the machine, whereby two numbers which are initially located each in a separate one of said external word storage means of the machine, can be fed to said two special registers and thereafter used as operands in a multiplication or division operation in the chosen manner determined by a single order to produce, in the case of multiplication, a double-length answer number of which the greater and less significant halves are located respectively in said first and second registers or, in the case of division, a quotient number located in the first of said special registers and a remainder number located in the second of said special registers.

In a particular arrangement according to the invention, the multiplication facilities comprise those of simple multiplication of two single word length numbers $n$ and $x$, the rounded-off multiplication of such numbers $n$ and $x$ and the multiplication of such numbers $n$ and $x$ with simultaneous addition of the resultant double-length product to a further double-length number whose respective halves were initially present in the two special registers. With the same arrangement the division facilities comprise both simple unrounded and rounded division, of a double-length number by a single word length number and also rounded division of one single word length number by another single word length number.

In order that the nature of the invention may be more readily understood one particular embodiment thereof will now be described with reference to the accompanying drawings, in which:

FIGS. 1a, 1b, 1c and 1d form a composite detailed block schematic diagram of the arrangements of the computing store of the machine, FIG. 1b showing the first of the two special registers and FIG. 1c the second of such two registers which are especially concerned with multiplication and division.

Figure 5:
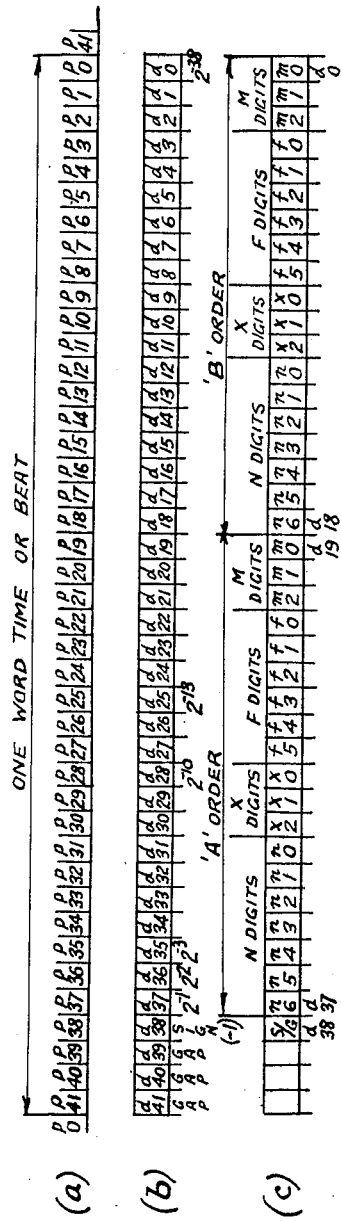

FIG. 5 comprises a series of chart diagrams showing the word formations used in the machine with relation to the standard timing of the machine operating rhythm.

FIG. 6 is a block schematic diagram showing the arrangements for generating the fundamental beat controlling waveforms.

The embodiment to be described forms part of an electronic digital computer of the kind described in greater detail in copending applications Nos. 560,831 filed January 23, 1956, (162A), 560,829, now abandoned, filed January 23, 1956, (162B) and 560,830 filed January 23, 1956 by C. Strachey and D. B. Gillies (162C) to which cross reference will hereinafter be made as references A, B and C respectively and to which reference should be made for more detailed description of certain parts.

FIGS. 1a, 1b, 1c, 1d, 2 and 6 of this specification correspond substantially with FIGS. 6a, 6b, 6c, 6d, 7 and 3 respectively of the aforesaid reference C although certain elements of the earlier figures have been omitted or modified slightly in the interest of clarity and simplicity.

Machine Signal Form

The machine operates with number and order words which are transmitted in serial form as electric pulse signal trains in which binary value "1" is denoted by a positive-going (approximately 13 v.) pulse within any given digit interval and in which binary value "0" is indicated by the absence of such a pulse and a sustained potential of below earth. Each word time consists of 42 digit intervals as indicated at $p0$, $p1$, $p2$ . . . $p41$ in FIG. 5a, each digit interval being of 3 microseconds duration. Each word time is thus of 126 microseconds duration.

Number words contain 39 significant digits $d0$ . . . $d38$, as shown in FIG. 5b, signalled in ascending power order during the first 39 digit intervals $p0$, $p1$ . . . $p38$ of each word time (standard machine timing). The remaining three digit places $d39$, $d40$, $d41$ at the most significant end of the number word constitute gap digits separating the significant digits of one word from those of the next. These gap digits are normally of value "0" and inoperative but may on occassion accommodate digit values caused by extension of a number for certain specific purposes. In the normal form of number word as illustrated in FIG. 5b the least significant or first occurring digit $d0$ is assumed to have the binary value $2^{-38}$ whereas the most significant digit $d38$ constitutes a sign digit of value $-1$. The next-to-most-significant digit $d37$ lying immediately before the sign digit is of value $2^{-1}$, i.e. of value $+\frac{1}{2}$.

Each order word is as shown in FIG. 5c and comprises 39 successive significant digit positions $d0$ . . . $d38$ as in the case of a number word. Such order word, however, contains two separate orders, known as the A and B orders respectively. Each order is of 19 digits length, the B order being accommodated in the first 19 digits $d0$ . . . $d18$ of the order word and the second or A order in the next 19 digit intervals $d19$ . . . $d37$. The remaining digit $d38$ constitutes what is known as a "stop-go" digit, the operation of which is described in detail in the aforesaid copending applications.

Each of the A and B orders has a similar form and contains, in time order commencing from the initial or lowest significant end, three M digits $m0$, $m1$ and $m2$ which govern the address selection of a modifier word used in modifying apparatus, six F digits $f0$, $f1$, $f2$, $f3$, $f4$ and $f5$ which are order digits and determine the nature of the computing operation performed by the machine. These are followed by three X digits $x0$, $x1$ and $x2$ which denote one address location within a particular one of a plurality of groups of word registers which constitute the high speed computing store of the machine while the order is completed by seven N digits $n0$, $n1$, $n2$, $n3$, $n4$, $n5$ and $n6$ which determine a second address location anywhere within such plurality of word registers of the high speed computing store.

Machine Rhythm

The machine operates with a rhythm comprising a major cycle or period made up of a plurality of sequential and equal length minor cycles or beats, the number of beats in each major cycle period being variable in accordance with the nature of the operation defined by the function digits F of the operative order. During the performance of simple computing operations each major cycle or period, known as an A or B period according to whether an A or B order is being obeyed, has a minimum length of two beats consisting of a first or D beat and a final or E beat. Such A and B periods are interspersed with further C periods during which a further order word is selected and fed into the control system. As such arrangements form no part of the present invention they will not be further described and reference is made to the aforesaid reference C, for any additional description which may be desired.

In multiplying operations with which the present invention is concerned, each A or B period comprises a total of either 15 or 16 consecutive beats, the first beat being a D beat which is followed by 12 similar intermediate beats $D+1 \ldots D+12$ followed in turned by a beat known as the K beat and this is followed by an L beat which may either coincide with or be followed by the final beat, i.e. the E beat.

In dividing operations in accordance with the invention, the total number of beats in the operative A or B period is 43, comprising a first or D beat followed by 40 similar intermediate beats $D+1 \ldots D+40$ which are followed in turn by the K beat and then the L beat which coincides with the final E beat.

General Arrangement of Machine

Figure 4:
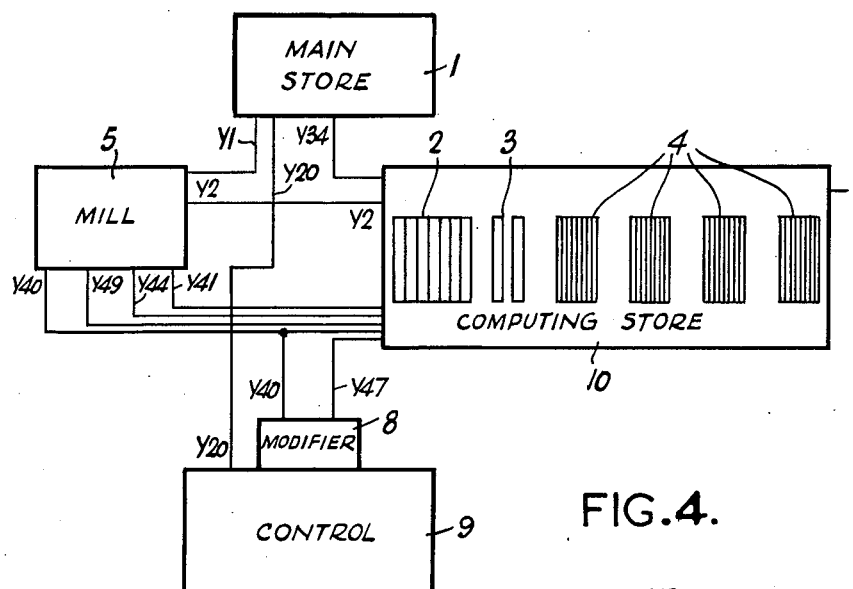
FIG. 4 is a block schematic diagram illustrating the general arrangement of the machine.

The general arrangement of the machine of the embodiment being described is shown in FIG. 4.

The machine comprises a main or low access speed data word store 1, a high access speed computing store 10 consisting of a group of single word accumulator registers 2, a number of groups of further single word high speed registers 4 and also a group 3 of further addresses which are equivalent to registers but which are actual sources of or destinations for signals, such as constant-representing signals, connections to input or output apparatus and the like.

The machine further includes a computing organ or mill 5 and a control system 9, the signal entry to which is by way of a modifier device 8.

Signals can be applied from the main store 1 to one input of the computing store 10 over a busbar Y34 while output signals from the mill 5 can be fed to another input of such computing store 10 over busbar Y2. Operand-representing signals from the computing store 10 can be fed to the mill 5 over any one or more of the busbars Y40, Y41, Y44 and Y49 as well as by other paths not shown while output signals from such computing store 10 can also be fed into the control system 9 through the modifier device 8 over a branch of the busbar Y40 and over a further busbar Y47.

It is to be noted that the rectangle defining the control system 9 is to be regarded as symbolic only since the various elements thereof, which control the machine rhythm and the routing of signals between the various parts of the machine through gate and like devices, are necessarily located in suitable positions dispersed throughout the machine and not grouped together as is suggested by such symbol.

Definition of Symbols

Before commencing a more detailed description of the machine illustrated in the drawings, a brief reference will be made to the form of the various block schematic symbols used in such drawings.

Figure 1A:
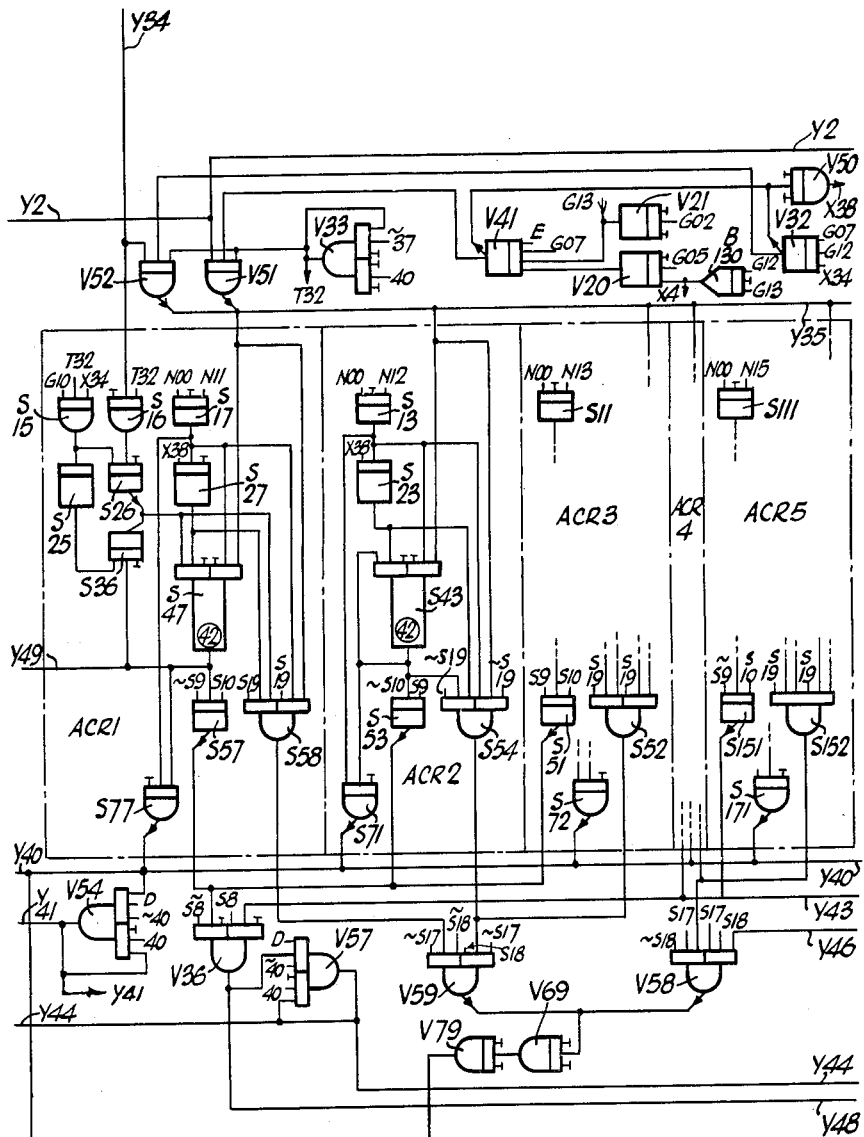

The symbol used, for example, at S13 in FIG. 1a denotes a multiple input "and" type gate circuit such as is shown in detail in FIG. 4b of the aforesaid reference A. This gate circuit serves to provide a positive-going or "on" output on its output lead only upon coincidence of positive-going inputs on each of its used input leads. For brevity such a device will hereinafter be referred to as a "gate."

The symbol used, for example, at S71 in FIG. 1a denotes a gate followed by a delay device imposing a time delay of 1 digit interval of the machine rhythm and provides a correspondingly delayed positive-going or "on" output on its output lead or leads only when each of the input leads to the gate which are in use is supplied simultaneously with positive-going inputs. The circuit arrangement of such a device is shown by the combination of FIG. 4b and FIG. 2b of the aforesaid reference A. For brevity such a device will hereinafter be referred to as a "unit delay."

The symbol used, for example, at S54 in FIG. 1a denotes a unit delay preceded by two alternatively operable multiple input "and" gate circuits and provides a positive-going output on its output lead or leads only when simultaneous positive-going inputs are applied to the used input leads of either one of the two input gate circuits. The circuit arrangement for such a device is shown in detail in FIG. 3c of the aforesaid reference A. For brevity such a device will hereinafter be referred to as a "double entry gated delay."

The symbol used, for example, at S23 in FIG. 1a denotes a multiple input "and" gate circuit followed by an inverter circuit and provides an output which is normally at positive-going or "on" level except when a positive-going input is applied simultaneously to each of the used inputs of the gate circuit whereupon the output from the inverter is at the negative-going or "0"-representing level. A circuit arrangement for such a device is shown in detail in FIG. 3c of the aforesaid reference A. For brevity such a device will hereinafter be referred to as an "inverter."

Figure 1B:
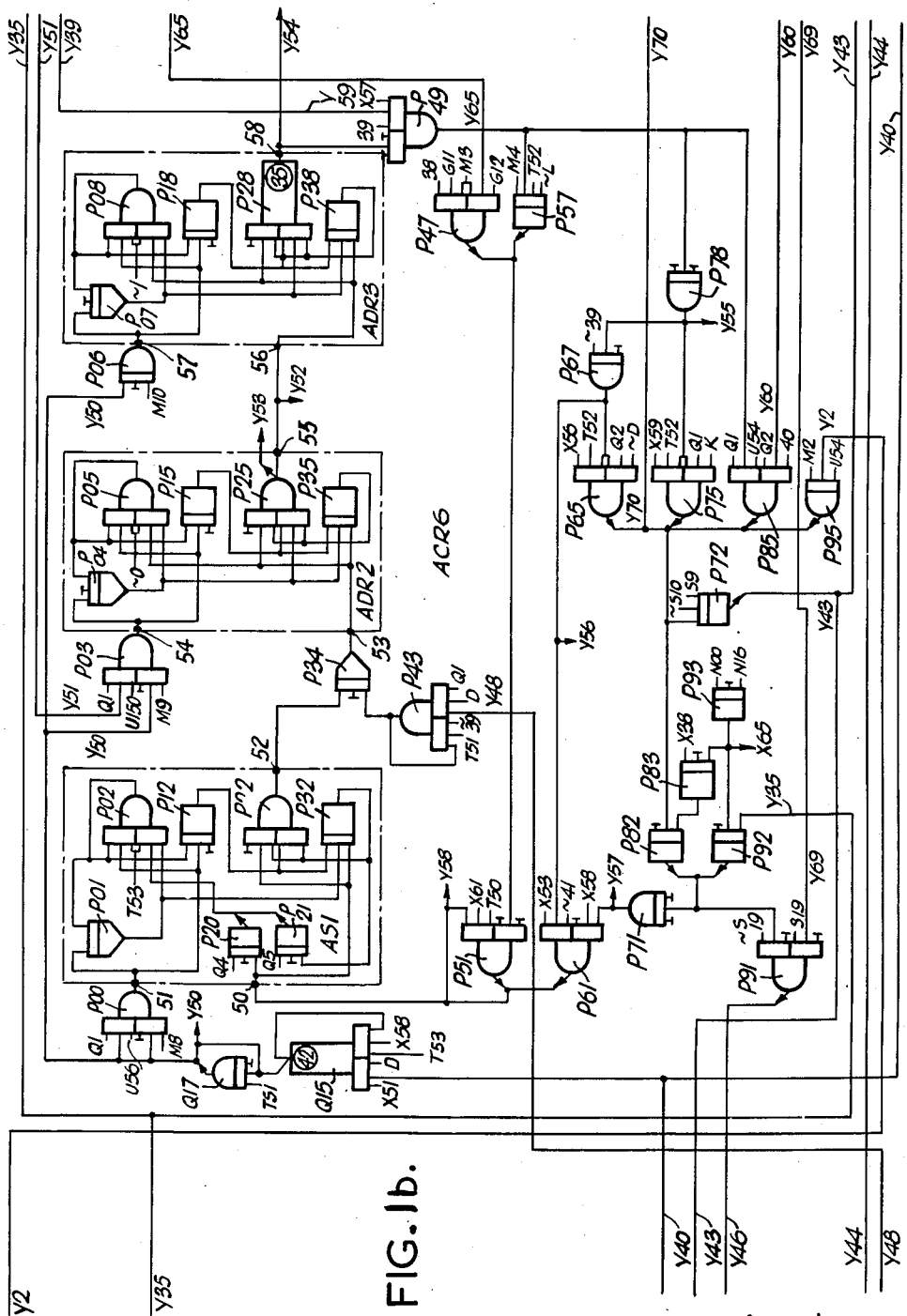

The symbol used, for example, at P01 in FIG. 1b denotes a mixer or buffer device providing a positive-going or "on" output on its output lead when any one or more of its used inputs is supplied with a positive-going or "on" input. A circuit arrangement for such a device is shown in detail in FIG. 5b of the aforesaid reference A. For brevity such a device will hereinafter be referred to as a "mixer."

The symbol used, for example, at S43 in FIG. 1a denotes a delay line of extended length with its associated driving, amplifying and shaping valve circuits and which is preceded by two alternatively operable multiple input "and" gate circuits whereby a positive-going or "on" output is obtained after the predetermined delay interval time set by the character of the delay line only on the occasion of simultaneous positive inputs to each of the used input leads of either one of the two input gate circuits. A circuit arrangement for such a device is provided by the arrangement of FIG. 3b, followed by FIG. 5b, followed by FIG. 9b, followed by FIG. 6b, followed by FIG. 7b, followed by FIG. 8b of the aforesaid reference A. The number of digit intervals of delay time provided by the complete device between input and output is either 35 digit intervals or 42 digit intervals of the machine rhythm and this number is indicated by the figure within the circle shown on the symbol. As will be understood such a device is capable of holding either 35 or 42 binary digit signals within its circuits at any one time. For brevity such a device will hereinafter be referred to as either a "35 interval delay line" or a "42 interval delay line."

Unused inputs of any gate circuit or the like are shown by a T-shaped free end and in practice these are actually left unconnected. Where only one input is used to a gate, the gating function obviously does not exist. A number of cathode follower circuits are provided in the actual machine for the purpose of affording a sufficiently low impedance signal source at various places but in the interests of clarity of description and drawings these have been omitted as they make no difference to the manner of operation. Other symbols employed in the drawings such as hand switches, key switches, resistors and capacitors are of the conventional form.

The legends attached to input and output leads denote the reference identification of various control and other waveforms which have a normal or "off" level of below earth potential and an operative or "on" level which is positive to earth.

Principal Machine Waveforms

The basic timing of the machine is controlled by the equivalent of clock pulses derived from a timing track on the magnetic drum type storage device which constitutes the main store 1. From such clock pulses there is derived, by means of a convenient form of commutator circuit described in detail in the aforesaid reference C, a series of digit interval pulses occurring one in each of the 42 digit intervals $p0 \ldots p41$ of each successive word time of the machine rhythm. Thus, there is available a waveform comprising a pulse at "on" level during the first digit interval 0 of each word time. This waveform, which is denoted in the drawings by the symbol 0 at the appropriate lead, will hereinafter be referred to as the 0 waveform. Similarly, digit pulse waveforms are available to define each of the other successive digit time intervals and these are referred to as the 1, 2, 3 ... 39, 40, 41 waveforms. In addition, the inverse version of each of these digit pulse waveforms is made available in the usual way. Such inverse versions consist, of course, of a waveform which is normally at the "on" level but which goes to the "off" level for the duration of the particular digit interval concerned.

Each of the A, B and C periods is defined by a controlling waveform generated by the arrangements shown in FIG. 6. These arrangements are described in detail in the aforesaid references and will therefore be only briefly referred to.

The arrangements comprise a group of five double entry gated delays J130, J132, J133, J134 and J135 each arranged as a trigger circuit. Delay J130 provides the A waveform defining, by its "on" periods, the A period of the machine rhythm while the output from delay J132 similarly provides and B waveform defining the B periods of the machine rhythm. An inverse version of this B waveform, the ~B waveform, is available from inverter J112. The outputs from the A and B delays J130 and J132 are combined to form the inverse version ~C of the C waveform which defines the C period of the machine rhythm, the C waveform itself being provided by the output from inverter J141.

Delay J133 provides the D waveform which defines, by its "on" periods, the first or D beat of each of the A or B periods of the machine rhythm while an inverter J152 provides the inverse version, i.e. the ~D waveform. Delay J134 provides the E waveform defining the last or E beat of each of the A, B or C periods of the machine rhythm, the inverter J154 providing the inverse or ~E waveform. Delay J135 provides the U10 waveform which is used as one controlling input for the gate J103.

The timings of these A, B, C and D and E waveforms are such that the "on" periods commence with the beginning of digit time $p41$ and terminate at the end of digit time $p40$.

In addition to these major cycle or period and minor cycle or beat defining waveforms, a considerable number of other waveforms are employed and a detailed description of these and their manner of generation is given in the aforesaid references. Principally, they comprise the S and N groups of waveforms which are derived by staticising the N, X and M digits of the operative A or B order, and the F and G groups of waveforms which are derived by staticising the F digits of the operative order. To facilitate understanding of the operation of the arrangements shown and described in the present application a brief review of these waveforms will be made.

The S1 waveform and the ~S1 waveform are governed by the value of the $n6$ digit of the order, the S1 waveform being "on" from digit time $p41$ until the following digit time $p40$ of beat D when such $n6$ digit is of value "1" and the ~S1 waveform, which is normally always "on," being "off" for the same period when the $n6$ digit is of value "0." The S2 and ~S2 waveforms are similarly determined by the value of the $n5$ digit, the S3 and ~S3 waveforms by the value of the $n4$ digit, the S4 and ~S4 waveforms by the value of the $n3$ digit, the S5 and ~S5 waveforms by the value of the $n2$ digit, the S6 and ~S6 waveforms by the of the $n1$ digit and the S7 and ~S7 waveforms by the value of the $n0$ digit.

The N waveforms are derived from gated combinations of the various S1 ... S7 waveforms to provide two coded groups. This, the N00 waveform is "on" only when the $n6 \ldots n3$ digits are value 0000, the N01 waveform is "on" only when such digits are 0001, the N02 waveform is "on" only when the same digits are 0010, the N03 waveform is "on" only when such digits are 0100, the N04 waveform when the digits are 1000 and the N05 waveform is "on" when the digits are 1001, the N06 waveform when the digits are 1010 and the N07 waveform when the digits are 1011. In a second group of these N waveforms, the N10 waveform is "on" only when the least significant three digits $n2$, $n1$ and $n0$ are respectively 000, the N11 waveform being "on" when such digits are 001, the N12 waveform being "on" when the digits are 010, the N13 waveform being "on" when the digits are 011, the N14 waveform being "on" when the digits are 100, the N15 waveform being "on" when the digits are 101, the N16 waveform being "on" when the digits are 110 and the N17 waveform being "on" only when the digits are 111.

Thus, register number 64 signalled by the N digits of an order having the significance 1000000 will cause the S2, S3, S4, S5, S6 and S7 waveforms to be "off" and the S1 waveform to be "on" while the N00 and N12 waveforms will each be "on," the other waveforms of this N group being "off" during the beat period concerned.

The group of waveforms S8 ... S10 are similarly derived by staticising the X digits of the order. This group of waveforms is each "on" between digit time $p0$ and the following digit time $p38$. The S8 waveform is "on" when the $x2$ digit is of value "1" and the ~S8 waveform is "on" when such $x2$ digit is of value "0." The S9 and ~S9 waveforms are similarly controlled by the $x1$ digit and the S10 and ~S10 waveforms by the $x0$ digit. These waveforms are not subjected to any coding.

The S17 ... S19 group of waveforms are similarly derived by staticising the M digits of the order. The S17 waveform is "on" from digit time $p26$ to the following digit time $p39$ when the $m2$ digit is of value "1"; the ~S17 waveform is similarly "on" only when the $m2$ digit is of value "0." Similarly, the S18 and ~S18 waveforms are determined by the value of the $m1$ digit. The S19 waveform is "on" from digit time $p25$ to the following digit time $p38$ only when the $m0$ digit is of value "1," the ~S19 waveform being similarly "on" when the $m0$ digit is of value "0."

The F group of waveforms F0 ... F5 are similarly derived by staticising the F digits of the order. The F0 waveform is "on" from digit time p0 of beat D until digit time p40 of the final beat E of any A or B period when the f5 digit is of value "1," the ~F0 waveform being similarly "on" when such f5 digit is of value "0." The F1 and ~F1 wave forms are similarly controlled by the f4 digit, the F2 and ~F2 waveforms by the f3 digit, the F3 and ~F3 waveforms by the f2 digit, the F4 and ~F4 waveforms by the f1 digit and the F5 and ~F5 waveforms by the f0 digit.

The G waveforms are formed by gated combinations of the various F waveforms in similar manner to the N waveforms referred to above. Thus, the G00 waveform is "on" from the digit time p1 of beat D until the digit time p41 of the final beat E when the f5, f4, and f3 digits are respectively of value 000. The G01 waveform is similarly "on" only when such digits are 001, the G02 waveform is "on" when such digits are 10, the G03 waveform is "on" only when such digits are 011, the G04 waveform is "on" when the digits are 110, the G05 waveform is "on" when the digits are 101 and the G06 waveform being "on" when the digits are 110 and the G07 waveform when such digits are 111. Similarly, the G10 waveform is "on" for the same period when the f2, f1 and f0 digits are respectively of value 000. The G11 waveform is "on" only when such digits are 001 and the G12 waveform is "on" when the digits are 010. The G13 waveform is "on" only when such digits are 011, the G14 waveform "on" when they are 100, the G15 waveform "on" when they are 101, and G16 waveform "on" when they are 110 and the G17 waveform "on" when they are 111.

Thus, the orders 20, 21, 22, 24, 25 and 26 with which the present invention is solely concerned are defined by the "on" state of the following waveforms. Order number 20 will cause the G02 and G10 waveforms to be "on," the corresponding F waveforms at "on" state being ~F0, F1, ~F2, ~F3, ~F4 and ~F5. Order number 21 will cause the G02 and G11 waveforms to be "on," the corresponding F waveform group at "on" level being ~F0, F1, ~F2, ~F3, ~F4 and F5. Order number 22 will cause the G02 and G12 waveforms to be "on" with the corresponding F waveform combination at "on" level of ~F0, F1, ~F2, ~F3, F4 and ~F5. Order number 24 will cause the G02 and G14 waveforms to be "on" and the ~F0, F1, ~F2, F3, ~F4 and ~F5 waveforms to be "on." Order number 25 will cause the G02 and G15 waveforms to be "on" together with the ~F0, F1, ~F2, F3, ~F4 and F5 waveforms. Order number 26 will cause the G02 and G16 waveforms to be "on" together with the ~F0, F1, ~F2, F3, F4 and ~F5.

*Computing Store—Registers ACR1 . . . ACR5 (Address Numbers 1–5)*

The first five of the group of accumulator registers 2, FIG. 4, are shown in FIG. 1a. These registers are described in detail in the aforesaid reference B and as they are fundamentally similar, the detailed arrangements of register ACR2 only will be discussed here and only to the extent necessary on account of its subsequent use in examples outlining the manner of operation of the multiplying/dividing arrangements.

This register comprises a 42 interval delay line S43 provided with a regeneration loop through the left-hand entry gate of the delay line controlled by the output from inverter S23 which is, in turn, supplied with the X38 waveform and the output from gate S13 controlled by the N00 and N12 waveforms. The opposite entry gate of the delay line is also controlled by the output from gate S13 and is supplied with input word signals from input busbar Y35 to which signals may be provided either from the main data store 1 by way of busbar Y34 and unit delay V52 or from the mill 5 by way of busbar Y2 and unit delay V51. Word signals on busbar Y35 are in synchronism with standard machine time.

The word signal output from the delay line S43, also at standard machine timing, is fed to gate S53 and to unit delay S71. Gate S53 is controlled by the S9 and ~S10 waveforms and, when opened, allows the output signals to flow by way of the left-hand input of double entry gated delay V36 to the busbar Y48 and also to a further double entry gated delay V57 and thence to busbar Y44. The entry gate of delay V36 is controlled by the ~S8 waveform while the delay V57 is arranged as part of a trigger circuit serving to test and repeat the signalled value of the sign digit (d38) of any word signal passing therethrough during a D beat period. Unit delay S71 is controlled by the output from gate S13 and, when opened, allows the line output to pass to output busbar Y40.

In the normal operation of this register, the presence of the particular N digit combination in an order defining address number 2 will cause the N00 and N12 waveforms to be "on." This, in turn, provides an "on" output from gate S13 which allows, according to the nature of the order, signals to enter the delay line S43 from busbar Y35 or signals already in the delay line to pass out to busbar Y40. If the X38 waveform is also "on," the output from inverter S23 is inhibited at the same time thereby breaking the regeneration loop around the delay line and erasing any signals previously registered therein. On the other hand, the presence of an X digit combination in an order defining address number 2 will cause the ~S8, S9 and ~S10 waveforms to be "on." This causes gate S53 and the left-hand entry gate of delay V36 to open whereby the signals already registered in the line S43 are made available on busbar Y48 and, in a D beat only, on busbar Y44 also.

*Computing Store—Registers 64–95 (Address Numbers 64–95)*

Figure 1C:
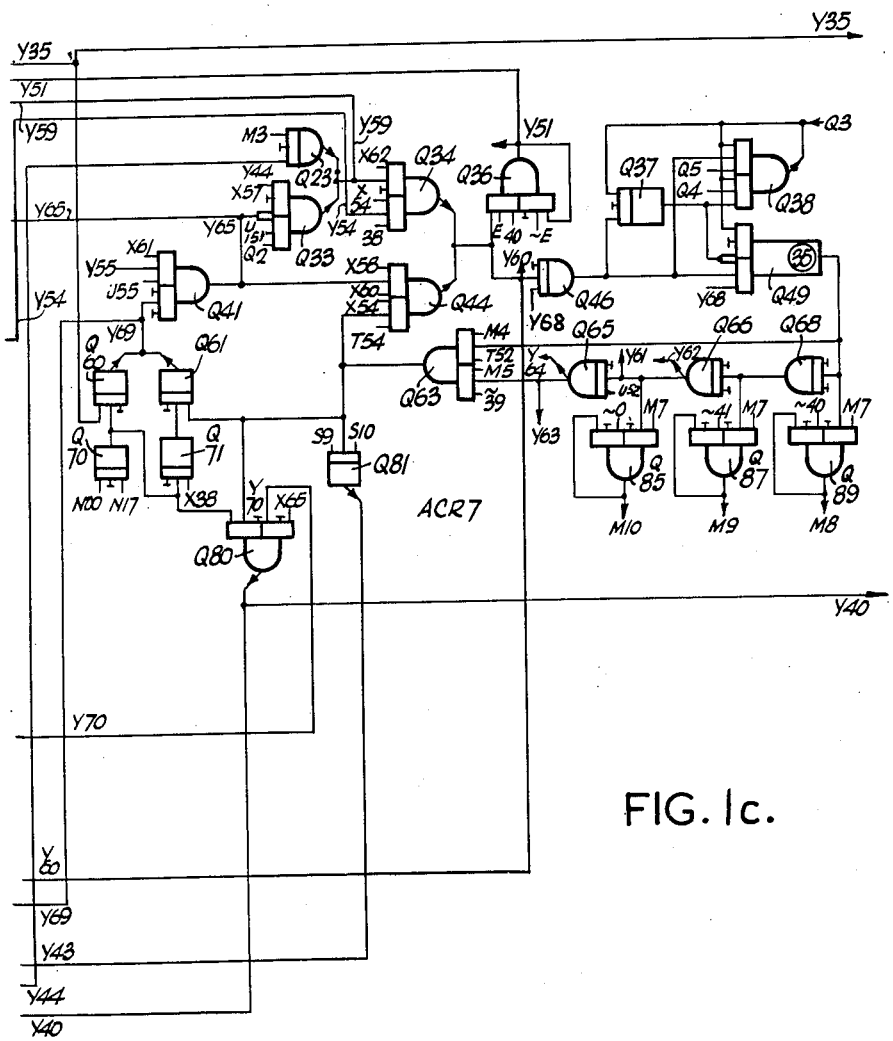
Figure 1D:
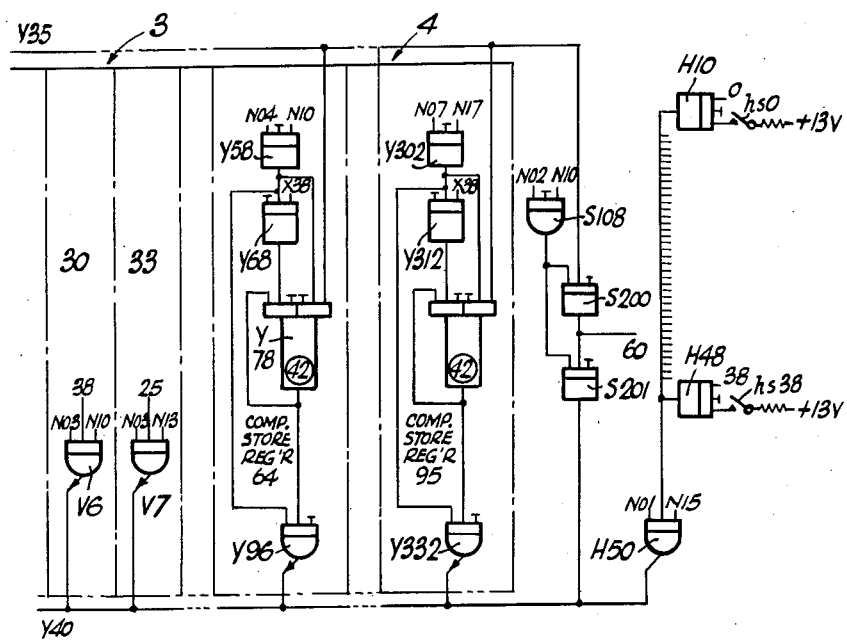

The form of the first and last of the registers in the four groups 4, FIG. 4, is shown in FIG. 1d. These registers and the other signal source and destination facilities also shown are likewise described in detail in the aforesaid reference B. The arrangements of register 64 only will be discussed here in view of its subsequent use in examples given later in explanation of the present invention.

This register comprises 42 interval delay line Y78 provided with a regeneration loop through its left-hand entry gate which is controlled by the output from inverter Y68 which is, in turn, supplied with the X38 waveform and the output from gate V58 controlled by the N04 and N10 waveforms. The opposite entry gate of the delay line is also controlled by the output from gate Y58 and is supplied with input word signals from input busbar Y35. The output from the delay line is fed, by way of unit delay Y96, also controlled by the output from gate Y58, to the busbar Y40.

This register, like all others of the 4 groups 4, is capable of selection only by the N digits of an order. The N digit combination defining address 64 causes the N04 and N10 waveforms to be "on" whereby signals can enter the delay line from busbar Y35 or leave on busbar Y40 by way of unit delay Y96, the X38 waveform controlling whether or not the existing signals in the delay line are erased at the same time.

*Computing Store—Register ACR6 (Address Number 6)*

The register ACR6, address number 6, which forms one of the two special word registers forming part of the multiply/divide arrangements according to the present invention, is shown in FIG. 1b. For convenience this register will hereafter be referred to as the "p" register.

Broadly, the arrangements comprise an arithmetical circuit AS1 which can be arranged, under signal control, to perform either addition or subtraction of two input numbers supplied thereto, a second adding circuit ADR2 and a third adding circuit ADR3, all arranged to form part of a continuous circulation loop which can be caused, again under signal control, to have a total delay time of either 39 digit intervals, 41 digit intervals, 42 digit intervals or 43 digit intervals.

The computing circuit AS1 comprises a known arrangement, shown within the chain dotted rectangle, of double entry gated delays P02 and P22, inverters P12 and P32, mixer P01 and gates P20 and P21 and is of a type which may be caused to effect addition or subtraction of input numbers represented respectively by the signals applied to its two separate input terminals 50 and 51 in accordance with the manner of control of the gates P20 and P21 by the Q4 and Q5 waveforms respectively. When the gate P20 is conditioned by the "on" state of the Q4 waveform supplied thereto from double entry unit delay M48, FIG. 3, the circuit AS1 will effect addition, whereas when the gate P21 is conditioned by the "on" state of the Q5 waveform supplied thereto from the inverter M49, FIG. 3, the computing circuit AS1 will effect subtraction. The resultant answer number is delivered at the output terminal 52 of the computing circuit.

The adding circuit ADR2 comprises a similar known arrangement, shown within the chain dotted rectangle, of double entry gated delays P05 and P25, inverters P15 and P35 and mixer P04 and is of a type which causes addition of the numbers represented respectively by the signals applied to its two separate input terminals 53 and 54. The resultant answer number signal is delivered at the output terminal 55 while a second, isolated, version of such output signal is also available over a separate busbar Y53.

The adding circuit ADR3 is generally similar to that of the circuit ADR2 except that the double entry unit delay P08 co-operates with a 35-interval delay line P28 instead of a second double entry unit delay as in the previous circuit. This adding circuit includes inverters P18 and P38 and mixer P07 and effects addition of the numbers represented respectively by the signals applied to its separate input terminals 56 and 57. The answer signal output is available at output terminal 58.

The total signal delay times of the computing circuit AS1 and the adding circuit ADR2 are each 1 digit interval only whereas that of the adding circuit ADR3 is 38 digit intervals.

The input signal to input terminal 51 of computing circuit AS1 is through one or other entry gates of a double entry gated delay P00 from a busbar Y50. One entry gate is controlled by the Q1 and U56 waveforms derived respectively from unit delays N80 and N26, FIG. 3, while the other entry gate is controlled by the M8 waveform from double entry gated delay Q89, FIG. 1c. The busbar Y50 is connected to the output of unit delay Q17 arranged as a sign digit repeater circuit under the control of the T51 waveform from unit delay N01, FIG. 3. The signal input to unit delay Q17 is from a separate single word storage device used for registering a single word length multiplicand number during a multiplication operation of a single word length divisor number during a division operation. This storage arrangement comprises a 42-interval delay line Q15 arranged as a word storage register by back-coupling its output to one of its input gates controlled also by the X58 waveform from inverter N49, FIG. 3. The alternative and signal input to this delay line Q15 is by way of the opposite entry gate from the busbar Y40 and is under the control of the D waveform and the X51 waveform from unit delay N42, FIG. 3. The second input to the computing circuit AS1 at terminal 50 is from the parallel connected outputs of double entry gated delays P51, P61. Delay P51 is arranged as a sign digit repeater of input signals arriving at its lower entry gate and is under the control of the X61 and T50 waveforms derived respectively from double entry gated delay N88 and mixer N00, FIG. 3. The delay P61 has one entry gate supplied from unit delay P71 under the control of the X58 waveform derived from inverter N49, FIG. 3.

The input signals to input terminal 54 of adding circuit ADR2 are from a double entry gated delay P03 of which one entry gate is supplied with the signals on busbar Y50 from the delay line register Q15 already referred to under the control of the M9 waveform from double entry gated delay Q87, FIG. 1c. The opposite entry gate of the delay P03 allows the input of signals over busbar Y51 from the second special word register ACR7 of FIG. 1c to be described later. This second entry gate is under the control of the Q1 and U150 waveforms derived respectively from unit delay N80 and unit delay N120, FIG. 3. The input signals to the second input terminal 53 of adding circuit ADR2 are through mixer P34 from either the output terminal 52 of the computing circuit AS1 or from double entry gated delay P43 which is arranged to copy the sign digit (d38) of any number signal supplied thereto over busbar Y48 under the control of the D, ~39, T51 and Q1 waveforms, the last two waveforms being derived respectively from the unit delays N01 and N80, FIG. 3.

The input terminal 57 of adding circuit ADR3 is supplied from the busbar Y50 through unit delay P06 under the control of the M10 waveform from double entry gated delay Q85, FIG. 1c, while the second input terminal 56 of this adding circuit is supplied directly from the output terminal 55 of the preceding adding circuit ADR2 which output terminal also feeds the Y52 busbar. The output terminal 58 of the adding circuit ADR3 is connected to the second special word register ACR7 of FIG. 1c by way of busbar Y54 and is also connected to one entry gate of double entry gated delay P49 whose opposite entry gate is supplied over busbar Y59 from the same second word storage register ACR7 to be described later. This second entry gate is controlled by the 39 and X57 waveforms, the latter being derived from the unit delay N48, FIG. 3.

The output from delay P49 is applied to gate P57, to unit delay P78 and to one entry gate of double entry gated delay P85. Gate P57 is controlled by the ~L, M4 and T52 waveforms derived respectively from inverter M81, gate N64 and inverter N02, FIG. 3. The entry gate of delay P85 is controlled by the Q1 and U54 waveforms derived respectively from unit delay N80 and gate N24, FIG. 3.

The output from gate P57 is connected to the lower entry gate of double entry gated delay P51 already referred to while the output from unit delay P78 is applied to each entry gate of double entry gated delay P75 and also to unit delay P67, the output of which in addition to being connected directly to the upper entry gate of delay P61 already referred to is also connected to each entry gate of double entry gated delay P65 and to busbar Y56. The upper entry gate of delay P75 is controlled by the X59 and T52 waveforms derived respectively from inverters N85 and N02, FIG. 3, whereas the lower entry gate is controlled by the Q1 and K waveforms derived respectively from unit delay N80 and double entry gated delay M51, FIG. 3. The unit delay P67 is controlled by the ~39 waveform. The lower entry gate of delay P65 is controlled by the ~D and Q2 waveforms, the latter being derived from gate N82, FIG. 3.

The outputs from delays P65, P75 and P85 are connected in parallel with that available from unit delay P95 and are fed over busbar Y70 to the second special word register ACR7, FIG. 1c, and also to gate P82. Gate P82, which is controlled by the output from inverter P83, has its output connected in parallel with that from gate P92 and applied to unit delay P71 already referred to which supplies the delay P61. The signal input to gate P92 is from the store input busbar Y35 and is under the control of the X65 waveform derived from gate P93 controlled by the N09 and N16 waveforms which are both "on" only when the N digits of the order define address 6. The same X65 waveform provides one controlling input to the inverter P83 already mentioned, the second input to such inverter being the X38 waveform already referred to in connection with registers ACR2 and 64.

The arrangements of gate P57 and delays P78, P67, P65, P75 and P85 provide the plurality of separate circulation paths already mentioned between the output terminal 58 of the adding circuit ADR3 and the input to the computing circuit AS1 for the purpose of introducing different values of time delay for word signals circulating around the loop which is completed through the computing circuit AS1 and the adding circuits ADR2 and ADR3. Such different time delay values are required at different times as will be described in detail later.

Thus, the first circulation path through gate P57 direct to delay P51 has a total delay time of 39 digit intervals only. This is 3 digit intervals short of the standard word length time of 42 digit intervals and will accordingly provide at each circulation a right shift by 3 digit places of any signal passing therearound. A second path by way of delays P78, P67 and thence direct to delay P61 has a total delay time of 41 digit intervals, i.e. 1 short of the standard word length time, whereby a right shift by 1 digit place only is provided at each circulation of a signal therearound. The third delay path by way of delays P78, P75, gate P82 and delays P71 and P61 has a total delay time of 42 digit intervals which, being equal to that of the normal word length time of the machine rhythm, will allow any signal circulating around this path to be held in an unchanged timing relationship to the machine rhythm. The fourth path by way of delays P78, P67, P65, gate P82 and delays P71 and P61 has a total delay time of 43 digit intervals, i.e. 1 in excess of the normal word length time, whereby there is a left shift by 1 digit place at each circulation of a signal therearound.

*Computing Store—Register ACR7 (Address Number 7)*

The register ACR7, address number 7, which forms the second of the two special word registers of the multiply/divide arrangements according to the invention, is shown in FIG. 1c. For convenience this register will hereinafter be referred to as the "q" register.

Broadly, the arrangements comprise a continuously circulating store whose total delay time may, under signal control, be made equal either to 42 digit intervals, i.e. one normal word length, or, alternatively, to 39 digit intervals whereby there is a right shift by 3 digit places of the number signal train circulating therearound.

The register comprises a 35-interval delay line Q49 associated with a half adder/subtractor device of known form constituted double entry gated delay Q38 and associated inverter Q37 receiving signals arriving from unit delay Q46 and at input Q3. The output from the delay line Q49 is applied directly to one entry gate of a double entry gated delay Q63 and is also fed by way of unit delays Q68, Q66 and Q65 to the opposite entry gate of the same delay Q63. The first entry gate of such delay Q63 is controlled by the M4 and T52 waveforms derived respectively from gate N64 and inverter N02, FIG. 3. The opposite entry gate of the delay Q63 is controlled by the ~39 and M5 waveforms, the latter being derived from inverter N65, FIG. 3. The unit delays Q68 and Q66 have no controlling inputs but the unit delay Q65 is controlled by the U52 waveform derived from the inverter N22, FIG. 3.

Figure 3:
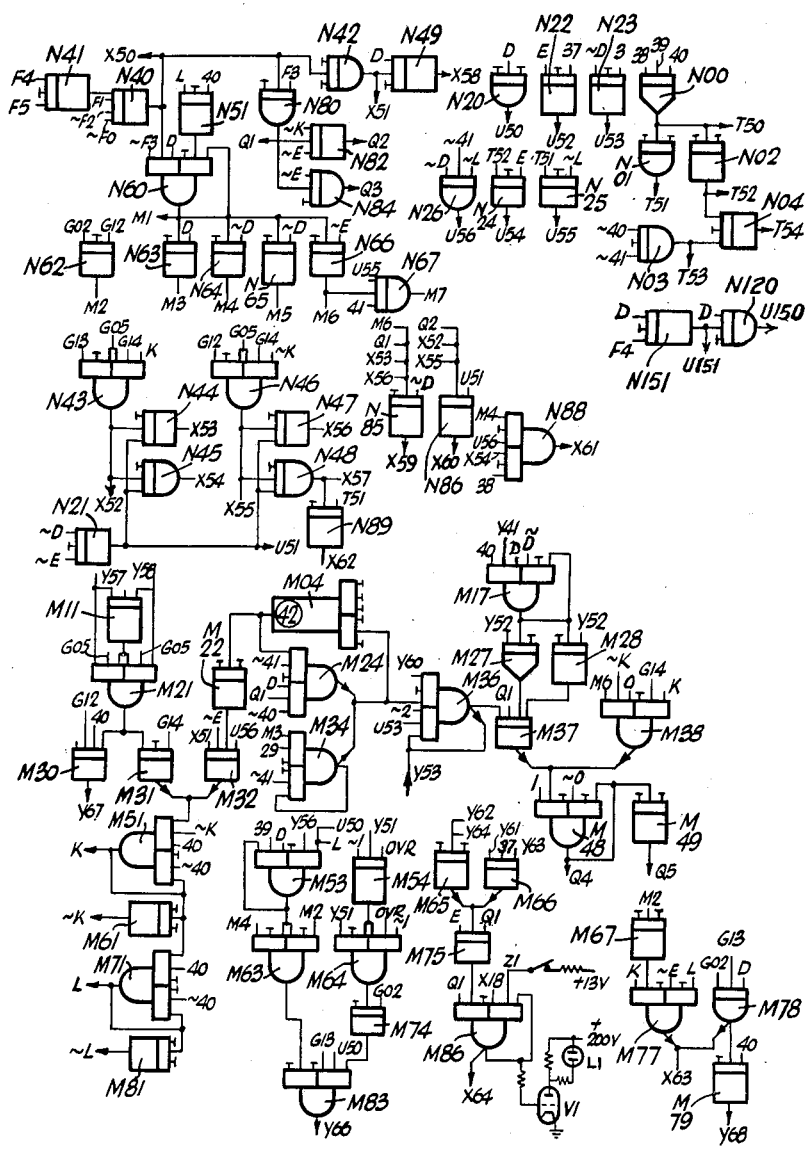
FIG. 3 is a detailed block schematic diagram of various other ancillary elements including means for generating certain of the necessary control waveforms used for effecting multiplication or division.

The input point of the delay Q68 is also connected to one entry gate of a double entry gated delay Q89 which is arranged as a trigger circuit controlled by the ~40 and M7 waveforms, the latter being derived from unit delay N67, FIG. 3. The output from this trigger circuit of delay Q89 constitutes the M8 waveform.

The input point of unit delay Q66 is similarly connected to a further double entry gated delay Q87 also arranged as a trigger circuit under the control of the ~41 and M7 waveforms to provide the M9 waveform, while the input point of unit delay Q65 is likewise connected to one entry gate of a further double entry gated delay Q85 also arranged as a trigger circuit under the control of the ~0 and M7 waveforms to provide the M10 waveform. Output signals from the unit delay Q66 are also made available on separate busbars Y61 and Y62 while the further delayed output signals from unit delay Q65 are likewise made available on separate busbars Y63 and Y64.

The output from delay Q63 is applied to one entry gate of double entry gated delay Q80 and also to gate Q61. The entry gate of delay Q80 is controlled by the Y70 waveform and the output of a gate Q70 referred to later. Gate Q61 is controlled by the output from an inverter Q71.

Delay Q80 has its output connected to the common output busbar Y49 of the computing store while the output of gate Q61 is connected in parallel with that of gate Q60 which derives signals from the common input busbar Y35 of the store under the control of the output from the gate Q70 previously referred to, which latter gate is controlled by the N00 and N17 waveforms. The inverter Q71 controlling the gate Q61 is also controlled by the output from gate Q70 in conjunction with the X38 waveform already referred to in connection with registers ACR2 and 64.

The parallel connected outputs from gates Q60 and Q61 are made available over busbar Y69 to the delay P91 of the "p" register, FIG. 1b, and are also applied to one entry gate of double entry gated delay Q41 whose output is connected to the busbar Y65 which feeds the delay P47 of the "p" register, FIG. 1b. This output is also applied to the upper entry gate of delay Q44 controlled by the X58 and X60 waveforms derived respectively from inverters N49 and N86, FIG. 3. The same output from delay Q41 is also applied to each of the entry gates of double entry gated delay Q33, the lower entry gate of which is under the control of the Q2 and U151 waveforms derived respectively from gate N82 and inverter N151, FIG. 3. The opposite entry gate of delay Q41 is supplied over the busbar Y55 from delay P78 of the "p" register, FIG. 1b, under the control of the X51 waveform from delay N42, FIG. 3.

The output from delay Q33 is connected in parallel with that from a unit delay Q23 which is supplied with signals from the common busbar Y44 of the computing store under the control of the M3 waveform derived from gate N63, FIG. 3. Such combined outputs of delays Q23 and Q33 are applied over the busbar Y59 to the delay P49 of the "p" register, FIG. 1b, and also to one entry gate of a further double entry gated delay Q34 under the control of the X62 waveform derived from inverter N89, FIG. 3. The output from delay Q34 is connected in parallel with that from delay Q44 and these are then applied over busbar Y60 to delay P85 in the "p" register, FIG. 1b, and also to one entry gate of delay M36 of the special multiply/divide control waveform generating arrangements shown in FIG. 3. The same combined outputs from delays Q34 and Q44 are also fed to one input gate of double entry gated delay Q36 controlled by the E and 40 waveforms, such delay being arranged as a trigger circuit by back-coupling its output to the opposite input gate controlled by the ~E waveform. The output from this trigger circuit of delay Q36 is applied to the Y51 busbar which supplies the upper entry gate of the delay P03 at the adding circuit ADR2 of the "p" register, FIG. 1b. The trigger circuit of delay Q36 provides an output signal which is indicative of the sign of the number stored in the arrangements of this particular "q" register as will be referred to later.

As will be evident from inspection of the various circuit components of this register, the total delay time of the circulation path from delay line Q49 directly to delay Q63 and thence by way of gate Q61 and delays Q41, Q44 and Q46 is 39 digit intervals whereas the delay by way of the 3 additional unit delays Q68, Q66 and Q65 is 42 digit intervals.

*Multiply/Divide Control Waveform Generating Arrangements*

The arrangements for generating the various special control waveforms used during multiplication and division, more particularly those of the M, Q, K and L groups together with certain of those of the T and U groups as referred to in the aforesaid reference A, B and C, are shown in FIG. 3.

Such arrangements comprise an inverter N41 controlled by the F4 and F5 waveforms providing an output to one input of a gate N40 controlled also by the F1, ~F2 and ~F0 waveforms. The output from gate N40 constitutes the X50 waveform and is also applied to one entry gate of a double entry gated delay N60 and to unit delays N80 and N42. The unit delay N42 is not otherwise controlled but the unit delay N80 is controlled by the F3 waveform while the entry gate of the delay N60 is controlled by the D and ~F3 waveforms.

The output from unit delay N42 provides the X51 waveform which is also applied to the inverter N49 controlled also by the D waveform and serving to provide the X58 waveform. The output from unit delay N80 constitutes the Q1 waveform which is also applied to gate N82 controlled also by the ~K and ~E waveforms to form the Q2 waveform and to unit delay N84 controlled also by the ~E waveform to provide the Q3 waveform.

The delay N60 is arranged as a trigger circuit by back-coupling its output, which forms the M1 waveform, to its opposite entry gate which is controlled by the output from inverter N51 controlled by the 40 and L waveforms, the latter being derived from double entry gated delay M71 of this same figure. This M1 waveform is also applied to each of gates N63, N64 and N66 and to inverter N65. Gate N63 is also controlled by the D waveform and provides the M3 waveform, gate N64 is controlled also by the ~D waveform and provides the M4 waveform, inverter N65 is also controlled by the ~D waveform and provides the M5 waveform while gate N66 is also controlled by the ~E waveform and provides the M6 waveform which latter wave waveform is also applied through unit delay N67 controlled by the 41 and U55 waveforms to form the M7 waveform. The U55 waveform for controlling unit delay N67 is derived from the gate N25 of this same figure.

An inverter N151 controlled by the D and F4 waveforms provides the U151 waveform which also operates as one controlling input for a unit delay N120 which is also controlled by the D waveform and which provides the U150 waveform. A unit delay N20 supplied with the D waveform provides the U50 waveform while an inverter N22, controlled by the E and 37 waveforms, provides the U52 waveform. Inverter N23 controlled by the ~D and 3 waveforms provides the U53 waveform. A unit delay N26 supplied with the ~D, ~41 and ~L waveforms provides the U56 waveform while a gate N24 controlled by the E and T52 waveforms provides the U54 waveform. The T52 waveform is derived from inverter N02 of this same figure. Gate N25 supplied with the T51 and ~L waveforms provides the U55 waveform. The T51 waveform for this gate is derived from unit delay N01 of this same figure.

A mixer N00 supplied with the 38, 39 and 40 waveforms provides the T50 waveform as its output, which waveform is also applied to unit delay N01 to form the T51 waveform and to inverter N02 to form the T52 waveform which also constitutes one input of an inverter N04 whose other controlling input comprises the T53 waveform derived from unit delay N03 which is supplied with the ~40 and ~41 waveforms. The output from this inverter N04 constitutes the T54 waveform.

Gate N21 controlled by the ~D and ~E waveforms provides the U51 waveform while an inverter N89 supplied with the X57 waveform from unit delay N48 and with the T51 waveform from delay N01 provides the X62 waveform.

An inverter N85 having one input supplied in parallel with the M6, Q1 and other waveforms and another input controlled by the ~D waveform provides the X59 waveform while another inverter N86 having one input supplied in parallel with the Q2 and other waveforms under the additional control of the U51 waveform from gate N21, provides the X60 waveform. Double entry gated delay N88 having one entry gate controlled by the M4 and U56 waveforms and the other entry gate controlled by the X54 and 38 waveforms provides the X61 waveform.

A 42-interval delay line M04 has its output back-coupled to one of its entry gates through a double entry gated delay M24 under the control of the ~41 waveform to form a single word storage system. The output from the delay line M04 is also applied through inverter M22 to one input of a gate M32 controlled also by the ~E, X51 and U56 waveforms, the latter being derived respectively from unit delays N42 and N26 of this same figure. The output from this gate M32 is applied to one entry gate of a double entry gated delay M51 connected as a trigger circuit and controlled by the ~K, 40 and ~40 waveforms. The output from this trigger circuit constitutes the K waveform. This K waveform output is also applied through inverter M61 to form the ~K waveform and is applied also as one input to one entry gate of a further double entry gated delay M71 under the additional control of the 40 waveform, such delay M71 being also connected as a trigger circuit by back-coupling its output to its opposite entry gate which is controlled by the ~40 waveform thereby to provide the L waveform. This L waveform is also applied to inverter M81 to firm the ~L waveform.

The opposite entry gate of delay M24 is controlled by the D, Q1 and ~40 waveforms and the output from this delay is connected in parallel with that from a further double entry gated delay M34 which is connected as a trigger circuit by back-coupling its output to one of its entry gates controlled also by the ~41 waveform, the opposite entry gate being supplied with the M3 and 29 waveforms. The joint output of delays M24 and M34, in addition to being connected to the delay line M04, are also fed to one entry gate of a further double entry gated delay M36 which is also connected as a trigger circuit by back-coupling its output to one of its entry gates controlled by the ~2 and U53 waveforms. The input busbar Y53 is also connected to this back-coupling circuit. The output from this delay M36 is applied to a gate M37 controlled also by the Q1 waveform and by the outputs from a mixer M27 and an inverter M38. A double entry gated delay M17 is connected as a trigger circuit by back-coupling its output to one of its entry gates controlled by the ~D waveform, the opposite gate being supplied with signals on the Y41 busbar under the control of the 40 and D waveforms. The output from this trigger circuit provides one controlling input to the mixer M27 which is also supplied from the Y52 busbar. This trigger circuit output also forms one controlling input of the inverter M28 which is also connected to the Y52 busbar.

A double entry gated delay M38 has one entry gate supplied with the G14 and K waveforms and the opposite entry gate with the M6 and ~K waveforms. The output from this delay M38 is connected in parallel with that from gate M37 and is applied to one entry gate of a double entry gated delay M48 under the control of the 1 waveform. This delay M38 is connected as a trigger circuit by back-coupling its output to its opposite entry gate controlled by the ~O waveform and provides the Q4 waveform which is also applied to inverter M49 to form the Q5 waveform.

A double entry gated delay M53 is connected as a trigger circuit by back-coupling its output to one entry gate controlled by the D and 39 waveforms, the opposite entry gate being connected to the busbar Y56 and controlled by the parallel connected U50 and L waveforms. The output from delay M53 is applied to each of the opposite entry gates of a double entry gated delay M63, one of such entry gates being controlled by the M4 waveform and the other by the M2 waveform. The output from delay M63 forms the input to one entry gate of a further double entry gated delay M83 whose output supplies the Y66 busbar.

An inverter M65 has a single input comprising a parallel connection to busbars Y62 and Y64 and provides an output which is connected in parallel with that from gate M66 controlled by signals on the Y61 and Y63 busbars and the 37 waveform. Such combined output forms one input of a gate M75 controlled by the E and Q1 waveforms and provides an output which forms one controlling input for one entry gate of a double entry gated delay M86 which entry gate is also controlled by the Q1 waveform. This delay M86 is connected as a trigger circuit by back-coupling its output to its opposite entry gate which is controlled also by the X18 waveform and Z1 waveform derived through a control switch from a source of positive potential +13 v. The output from delay M86 constitutes the X64 waveform which also supplies operating potential to the control grid of a valve V1 having a neon indicator lamp L1 connected across an anode load which is supplied from a source of positive potential +200 v.

An inverter M67 has a single input supplied with the M2 waveform and has its output connected as one controlling input of one entry gate of a double entry gated delay M77, the other controlling input of which is the K waveform. The opposite entry gate of this delay M77 is controlled by the ~E and L waveforms and the output from the delay forms the X63 waveform.

Mill

Figure 2:
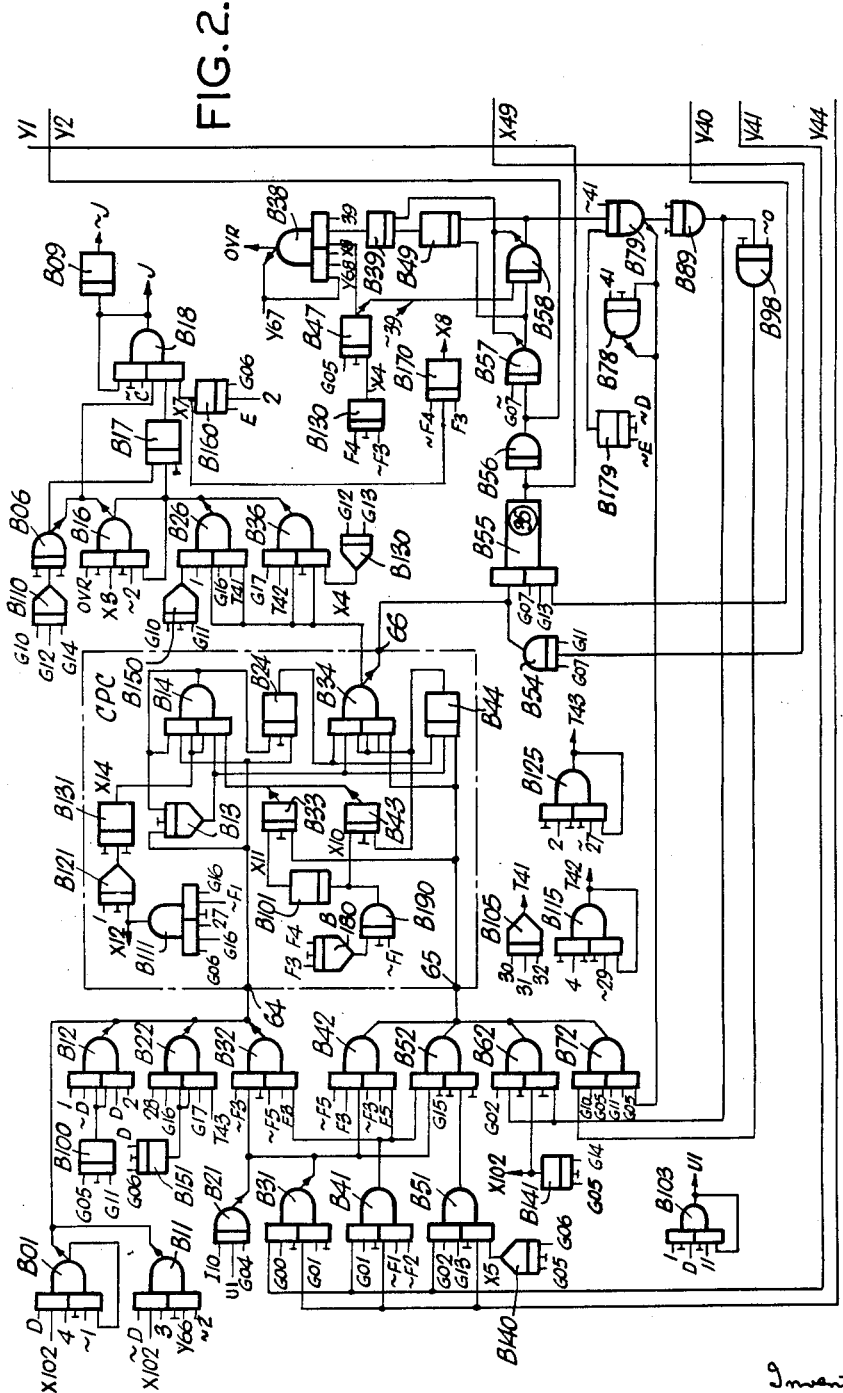
FIG. 2 is a similar detailed block schematic diagram of the arrangements of the associated mill or computing organ.

The arrangements of the computing organ or mill 5, FIG. 1, are shown in some detail in FIG. 2 but only certain parts more especially concerned with the multiplication and division arrangements of the present invention will be dealt with. For a more complete description reference should be made to the aforesaid references A, B and C. The mill comprises a computing circuit CPC consisting of a known arrangement of elements shown within the chain dotted line rectangle including double entry gated delays B14, B34 and B111, inverters B24, B44, B101 and B131, gates B33 and B44, unit delay B190 and mixers B13, B121 and B180. These elements are arranged, in known manner, to be capable of operation to effect either addition or subtraction of numbers represented by pulse signal trains applied to the first and second input terminals 64 and 65 in accordance with the form of various control waveforms which are supplied to the computing circuit. The answer-representing signal is available from the delay B34 at output terminal 66.

The first input terminal 64 is supplied from various sources including double entry gated delays B11 and B32. The second input terminal 65 is likewise supplied from various sources including double entry gated delays B42, B52 and B62.

Delay B11 has its lower entry gate supplied with signals on the busbar Y66 from delay M83, FIG. 3, under the control of the ~2 waveform while delay B32 has one entry gate connected to the output of double entry gated delay B31 under the control of the ~F3 waveform. The opposite entry gate of this delay B32 is supplied with the output from double entry gated delay B41 under the control of the F3 and ~F5 waveforms.

Delay B42 has one of its entry gates supplied with the output from the delay B31 under the control of the F3 and ~F5 waveforms while its opposite entry gate is supplied from the output from delay B41 under the control of the ~F3 and F5 waveforms. Delay B52 has one of its entry gates supplied with the outputs of delays B31 and B41 under the control of the G15 waveform.

The input busbar Y41 from the computing store 10 is connected to one entry gate of the delay B31 under the control of the G00 waveform and to one entry gate of the delay B41 under the control of the G01 waveform. The further input busbar Y44 from the computing store 10 is connected to the opposite entry gate of delay B31 under the control of the G01 waveform and to the opposite entry gate of delay B41 under the control of the ~F1 and ~F2 waveforms.

The output terminal 66 of the computing circuit CPC is connected to one entry gate of a 35-interval delay line B55 while the output from this delay line is connected to the output busbar Y1 leading to the main store 1 and also through unit delay B56 to output busbar Y2 leading to the computing store 10. The output from delay B56 is also fed through a further unit delay B57, controlled by the ~G07 waveform, to a further unit delay B58 which is controlled, inter alia, by the ~39 waveform. The output from delay B58 is applied to unit delay B79 and also as one controlling input for inverter B49, the other controlling input of which is derived from the output from delay B57. Alternative, isolated, outputs from delays B57 and B58 are also connected in parallel for application to a gate B39 also controlled by the output from the inverter B49. The output from gate B39 forms one controlling input for one entry gate of a double entry gated delay B38 also controlled by the 39 waveform and the output from inverter B47. This delay B38 is connected as a trigger circuit by back-coupling its output to its opposite input gate which is controlled by the Y68 and X8 waveforms. The back-coupling circuit is also connected to be supplied from the Y67 busbar while the output from this trigger circuit constitutes the OVR or overflow indicating waveform.

The unit delay B79 is controlled by the ~41 waveform and the output from gate B179 controlled by the ~D and ~E waveform. This delay B79 forms part of a circulation path which may be provided, when required, around the arrangements of the mill. This circulation path can be arranged, under signal control, to have any one of a number of different overall delay times according to requirements. One circulation path is from delay B79 through unit delay B89 and thence directly to the upper entry gate of delay B62 controlled by the G02 waveform. This circulation path is one of 42 digit intervals delay time and signals circulating therearound will accordingly remain in unaltered timing relationship to the machine rhythm.

Operation

The manner of operation of the machine in connection with the special multiplying/dividing arrangements of the present invention, follows the basic rhythm described in detail in the aforesaid references A, B and C. That is to say, in the D beat of a C period of the machine rhythm a new order word, containing two separate A and B orders, is selected and is obtained from one of the plurality of registers of the computing store 10 and is fed into the control system 9 by way of the busbar Y40 together with, if called for, a modifier word by way of the busbar Y47, the modifier word being combined with the selected order word in the modifier 8 before finally becoming effective on the various N,X and F digit staticisors. Such staticisors become set by the beginning of the next order period which is normally the A order. The B or second order is obeyed subsequently in a group of beats defined collectively as the B period subsequent to the A period.

The detailed operation of the multiply and divide arrangements will now be considered for each of the different relevant orders of the order code which are as follows.

Order 20 $\quad -[pq]' = nx$

Order 21 $\quad -p' = nx$ (rounded)

Order 22 $\quad -[pq]' = nx + p + 2^{-38}q$

Order 24 $-q' + \dfrac{2^{-38}p'}{n} = \dfrac{x + 2^{-38}q}{n}$ ($q'$ being unrounded)

Order 25—$q' + \frac{2^{-38}p'}{n} = \frac{x + 2^{-38}q}{n}$ ($q'$ being rounded)

Order 26—$q' + \frac{2^{-38}p'}{n} = \frac{x}{n}$ ($q'$ being rounded)

Operation—Order 20

Order 20 calls for the performance of the function "multiply $n$ (i.e. the number in the computing store address defined by the N digits of the order) by $x$ (i.e. the number in the computing store address defined by the X digits of the order) to give a double-length product." Such product is to have its most significant half located in the "$p$" register and the least significant half in the "$q$" register.

In the following example it will be assumed that the address specified by the N digits of the order is that of computing store register 64 and that the address specified by the X digits is that of accumulator register 2. In consequence of these particular N and X address digit combinations, the N04 and N10 waveforms will be "on" during beat D together with the ~S8, S9 and ~S10 waveforms. As a result of the F digit combination specifying order 20 the function waveforms ~F0, F1, ~F2, ~F3, ~F4 and ~F5 will be "on" and those of F0, ~F1, F2, F3, F4 and F5 will be "off" from time $p0$ of the said D beat until time $p40$ of the final E beat. The related coded F digit waveforms G02 and G10 will be "on" and the remaining G waveforms "off" from time $p1$ of beat D to time $p41$ at the end of beat E.

This order requires a total period (A or B) of fifteen consecutive beats, namely, a first or D beat, twelve intermediate beats $D+1$, $D+2$ ... $D+12$, a K beat and a final $L/E$ beat.

At the commencement of the first beat D the N04 and N10 waveforms at gate Y58, FIG. 1d, will provide a gate output which will allow the $n$ number held in delay line Y78 to flow through unit delay Y96 to the Y40 busbar. The now-inhibited output from inverter Y68 breaks the regeneration loop around the delay line Y78 to clear the register. At the same time the S9 and ~S10 waveforms at gate S53 of register ACR2, FIG. 1a, and the ~S8 waveform at the left entry gate of delay V36 allows the $x$ number in delay line S43 to flow to the busbar Y44 through the further delay V57.

During this same beat D the X50 waveform from gate N40, FIG. 3, comes "on" owing to the particular combination of F waveforms and the X58 waveform from inverter N49, FIG. 3, goes "off" and breaks the regenerative loop of the multiplicand register constituted by the delay line Q15, FIG. 1b, with its feedback loop, thereby clearing such multiplicand register of any previous contents. At the same time the "off" state of such X58 waveform also blocks the normal regeneration path of the "$p$" register ACR6 at the lower entry gate of delay P61. The same waveform X58 applied to the upper entry gate of delay Q44 of the "$q$" register ACR7, FIG. 1c, likewise blocks the normal regeneration loop of such register. In this way both of the special accumulator registers "$p$" and "$q$" are cleared of any previous contents.

Such X58 waveform goes "off" at digit time $p1$ which is 1 digit time later than that when the F waveforms come "on." In consequence it is applied to those points in the registers where the word digit timing is delayed 1 digit time on standard machine time. Since waveform X58 is still "on" at the preceding digit times $p41$ and $p0$, it is combined in the feedback gate of the multiplicand register of delay line Q15 with the T53 waveform derived from unit delay N03, FIG. 3. This ensures that any digit signals which might enter or be generated in the multiplicand register at digit times $p41$ and $p0$ cannot eventually appear at the output with the timing of repeated sign digits.

During this same D beat the multiplicand number $n$ from register 64, now available on busbar Y40, enters the delay line Q15, FIG. 1b, through the left-hand entry gate now opened by the D and X51 waveforms, the latter being derived from the unit delay N42, FIG. 3. The multiplier number $x$ from accumulator register 2, available on busbar Y44, similarly passes to the "$q$" register, FIG. 1c, and enters such register through the unit delay Q23, now opened by the M3 waveform from gate N63, FIG. 3. This number is 2 digit intervals late owing to delays V36 and V57, its sign digit $d38$ occurring in digit time $p40$ and the repeated sign digit $d39$ provided by the sign repeater circuit of delay V57 being in digit time $p41$. The M3 waveform, which is "on" only from digit time $p1$ to digit time $p40$ of the D beat, serves to gate the incoming digit signals whereby the repeated sign digit $d39$ in digit time $p41$ does not enter this "$q$" register.

In this D beat also, the M3 waveform applied to the upper entry gate of delay M34, FIG. 3, allows the pulse of the 29 waveform in digit time $p29$ to set the trigger circuit formed around this delay to the "on" state, such trigger circuit being set "off" again at the following digit time $p41$ by the ~41 waveform on its opposite feedback gate. The "on" state of this trigger circuit provides a series of 12 digit pulses in digit times $p30$, $p31$ ... $p41$ at its output and these are applied to the input of 42 interval delay line M04 which forms part of a 43 interval circulation loop completed through the upper entry gate of delay M24. Such group of 12 pulses accordingly commence to circulate around the storage loop with a progressive left shift by one digit time at each circulation. The ~41 waveform which also controls the upper entry gate of delay M24 causes erasure of the most significant digit, occurring in digit time $p41$, as it becomes shifted at each circulation so that after a total of 12 circulations, i.e. 12 beats, the original series of inserted pulses is completely erased with effects which will be explained later.

At the end of the D beat the M4 waveform from gate N64, FIG. 3, goes "on" and the M5 waveform from inverter N65, FIG. 3, goes "off," each at digit time $p41$. These waveforms control respectively the upper and lower entry gates of double entry gated delay Q63 of the "$q$" register, FIG. 1c, so that at this instant at the end of the D beat the normal 42 digit time delay path through unit delay Q46, delay line Q49 and unit delays Q68, Q66 and Q65 is closed and an alternative path of only 39 digit time delay direct from the delay line Q49 to the delay Q63 is opened. This shortened loop path provides for the required 3 digit right shift of the multiplier number now in the "$q$" register each time it circulates therearound.

The multiplier number $x$ arriving on busbar Y44 was, it will be remembered, 2 digit times late on standard time and it accordingly emerges from delay line Q49 and arrives at the upper entry gate of delay Q63, FIG. 1c, between digit times $p40$ of beat D and $p36$ of the next beat $D+1$. The M4 waveform in conjunction with the T52 waveform from inverter N02, FIG. 3, opens the upper entry gate of delay Q63 only at digit time $p41$ and in consequence the least significant digit $d0$ of the multiplier number is erased and the rest of the number retained for recirculation through gate Q61, delay Q41 and delay Q44 to delay Q46 and thence to the delay line Q49. As a result of the erasure of the digit $d0$ there is still a gap of one digit time between the opposite ends of the circulating signal in spite of the shortened delay path. The output from the delay line Q49 is, however, free to enter the chain of unit delays Q63, Q66 and Q65 and at the immediately following digit time $p0$, the three least significant digits $d2$, $d1$ and $d0$ of the multiplier number are present respectively at the inputs to unit delays Q68, Q66, and Q65 and accordingly are available to be staticised at this instant by the testing action of the M7 waveform at the entry gates of the three delays Q89, Q87 and Q85 which are arranged as trigger circuits providing the output waveforms M8, M9 and M10 respectively. The M7 waveform is derived from unit delay N67, FIG. 3, and comprises a single digit pulse at this digit time $p0$. If the available multiplier digit is of value "1," the associated trigger circuit is set "on" whereas if the digit is of value "0" the trigger circuit remains "off." As a result of this the respective output waveforms M8, M9 and M10 represent staticised versions of the three examined multiplier digits, the M8 waveform being that of the most significant of the three tested digits and the M10 waveform that of the least significant of the three digits. These three waveforms M8, M9 and M10 are significant from digit time $p1$ of the beat $D+1$ to the next following digit times $p40$, $p41$ and $p0$ respectively.

The M8 waveform is used to gate the entry of the multiplicand number $n$ through the lower entry gate of delay P00, FIG. 1b, into the add/subtract circuit AS1 of the "p" register, the M9 waveform being similarly used to gate such multiplicand number $n$ through the lower entry gate of delay P03 to the adding circuit ADR2 of such register, and the M10 waveform being used to gate the same multiplicand number $n$ through delay P06 into the adding circuit ADR3 of the register. The computing circuit AS1 is at this time operative to effect addition since the controlling Q4 waveform from delay M48, FIG. 3, applied to gate P20 is "on" at all times except during a K beat and the related Q5 waveform applied to gate P21 is "off."

During this same second beat $D+1$ the multiplicand number $n$ previously supplied to the register of delay line Q15 commences to emerge therefrom and to pass through the sign repeater circuit of unit delay Q17 to the entry gates of the computing and adding circuits AS1, ADR2 and ADR3 previously mentioned. The timing of the digits $d0 \ldots d38$ of this multiplicand number at the output from delay line Q15 is from digit time $p1$ to digit time $p39$ of beat $D+1$, repetitions of the sign digit $d38$ appearing in the following digit times $p40$, $p41$ and $p0$ owing to the action of the T51 waveform from unit delay N01, FIG. 3, at the sign repeater circuit of delay Q17.

As the M8 waveform from delay Q89, FIG. 1c, is always "off" at digit times $p41$ and $p0$ only two of the four repeated sign digits can enter the computing circuit AS1; moreover, any "carry" in this adder beyond the second sign digit is prevented by the action of the suppression waveform T53 from unit delay N03, FIG. 3, applied to the delay P02 of the "carry" delay circuit. The multiplicand signal entering the second adder ADR2 similarly contains only three of the four repeated sign digits owing to the action of the M9 waveform which is always "off" at digit time $p0$ but the multiplicand signal entering the third adder circuit ADR3 contains all four repeated sign digits owing to the fact that the M10 waveform does not go "off" until digit time $p1$. The delay of 1 digit time in each of the first two adding circuits ensures that the three partial products are properly added in echelon, the first partial sum appearing at the output of the delay line P28 with the timing of its digits $d0 \ldots d41$ between digit time $p37$ of beat $D+1$ and digit time $p36$ of beat $D+2$ and with the most significant digit $d41$ of the pulse train indicating the sign.

The partial sum thus derived circulates around the "p" register by way of delay P49, gate P57 and delay P51 but the least significant three digits $d0$, $d1$ and $d2$ thereof are prevented from passing the gate P57 owing to the action of the T52 waveform from inverter N02, FIG. 3, which is "off" for digit times $p38$, $p39$ and $p40$. Instead, these three digits are shunted through delay P78 to the busbar Y55 where they occur in digit times $p39$, $p40$ and $p41$. By this busbar Y55 they are fed to the upper entry gate of the delay Q41 of the "q" register. This entry gate is controlled to open at these digit times $p39$, $p40$, $p41$ by the action of the U55 waveform from gate N25, FIG. 3. During this beat $D+1$ the remaining digits $d1 \ldots d38$ of the multiplier number $x$ circulate around the "q" register, now 39 intervals delay time, so that digits $d1$, $d2$ and $d3$ thereof arrive at the upper entry gate of delay Q63 at digit times $p38$, $p39$ and $p40$ when this gate is closed by the T52 waveform. These three digits are thus erased from the circulating $x$ number and provide room for the transferred partial product digits entering through delay Q41.

The sign digit of the first partial sum circulating in the "p" register appears at the output of delay P51 at digit time $p38$ of beat $D+2$ and is then repeated three times by the action of the feedback circuit through the upper entry gate of this delay under the control of the X61 and T50 waveforms derived respectively from delay N88 and mixer N00, FIG. 3. By this means the partial product signal is suitably extended so that its sign digits will properly align with the sign digits of the partial products formed in the next word time.

At the beginning of this beat, at digit time $p41$, the upper entry gate of delay M24, FIG. 3, is closed and this, owing to the 43 interval delay time of the loop circuit through delay line M04, causes erasure of one of the twelve digit pulses circulating around the loop.

The digits of the multiplier number $x$, reduced in number by three as above described, still remaining in the "q" register appear at the output of delay Q41 at digit times $p1 \ldots p38$ of beat $D+1$ and are followed by the three transferred least significant product digits in digit time $p40$ at the end of beat $D+1$ and digit times $p41$ and $p0$ at the beginning of the following beat $D+2$. At digit time $p0$ of beat $D+2$, the digits $d3$, $d4$ and $d5$ of the multiplier number $x$ are now distributed at the inputs to unit delays Q68, Q66 and Q65 thereby providing the necessary inputs to the three staticisor trigger circuits of delays Q89, Q87 and Q85 and 1 digit time later, i.e. at digit time $p1$ of beat $D+2$, the output waveforms M8, M9 and M10 become significant again of the staticised values of these next three multiplier digits. These three digits are simultaneously erased from the signal circulating in the "q" register in the manner as described above.

During this beat $D+2$, the timing waveform T52, "on" from digit time $p41$ to the following digit time $p37$, effective at the upper entry gate of delay Q63, allows the still remaining multiplier digits $d6 \ldots d38$ to pass therethrough followed by one gap digit and the three least significant product digits previously shunted from the "p" register. The remaining events during beat $D+2$ are similar to those as described above occurring in beat $D+1$. Another one of the train of 12 pulses initially set circulating in the loop around delay line M04, FIG. 3, is erased.

The sequence of events described above for beat $D+2$ is repeated a further nine times during the following intermediate beats $D+3 \ldots D+11$.

At each beat the three least significant digits remaining in the truncated multiplier number $x$ are sensed at the delays Q85, Q87 and Q89 and three digits erased, the resultant M8, M9 and M10 waveforms being used to control the admission or non-admission of the multiplicand number $n$ from the delay line Q15 into the computing circuit AS1 and adding circuits ADR2, ADR3 of the "p" register. The three least significant digits of the resultant partial product signal circulating in the "p" register are erased and transferred to the "q" register where they are positioned behind the previously inserted digits, of lower significance, of the final product signal which is being assembled in such "q" register in gradually increasing length behind the gradually decreasing length of the multiplier signal.

During beat $D+12$ the same sequence of events is repeated for the last time. The most significant five multiplier digits $d34 \ldots d38$ appear at the output of the delay Q41 of the "q" register, FIG. 1c, in digit times $p1 \ldots p5$, the rest of the digits of the multiplier number $x$ having been progressively deleted during preceding circulations around the register. These five remaining digits are followed by a gap digit in time $p6$ and then by 36 product digits which have been shunted from the "p" register, the last two and most significant of these appearing at the output of the delay Q41 at digit times p41 and p0 of the next following beat K.

At the end of this beat the content of the loop around the delay line M04, FIG. 3, will have been reduced to one pulse emerging from the line at time p41. At the immediately preceding digit time p40, the line output is zero with the result that inverter M22 provides an "on" output to gate M32 whose other inputs are also "on" at this time. As a result a pulse in digit time p40 is passed to the trigger circuit of delay M51 which is set "on" to initiate the "on" period of the K waveform defining the K beat.

The three multiplier digits d2, d1 and d0 are staticised as before at digit time p0 of beat K at the trigger circuits of delays Q89, Q87 and Q85, the waveform M8 which is significant of the value of the sign digit d0 being available from digit time p1 to digit time p40. During this beat K, the adder/subtractor circuit AS1 of the "p" register is set to subtract instead of to add by reason of the Q5 waveform going "on" and the Q4 waveform going "off" due to the action of the ~K waveform at the left-hand entry gate of delay M38, FIG. 3. The final partial sum comprising the addition of the partial products of n times digit d36 and n times digit d37 less n times digit d38 appears at the output of the delay line P28 of the "p" register with the digit timing p37 of beat K to p36 of the final beat L/E. During the digit times p39 and p40 of beat K two more product digits are shunted into the "q" register but at digit time p41 the ~L waveform goes "off" owing to the triggering "on" of the trigger circuit around delay M71, FIG. 3. As a result of this, the U55 waveform from gate N25, FIG. 3, goes "off" and the entry gate of delay Q41 is closed to prevent the passage of a third product digit.

The presence of the K waveform at the left-hand entry gate of delay M77, FIG. 3, in the absence of the M2 waveform to inverter M67 causes the X63 waveform to come "on." This provides an input to the trigger circuit around delay J134, FIG. 6, whereby the E waveform comes "on" at the same instant as the L waveform from delay M71, FIG. 3. At digit time p41, at the commencement of beat L/E, the "q" register contains 38 product digits and these appear at the output of delay Q41 from digit time p4 of beat K to the following digit time p41 and they are preceded by the two still remaining multiplier digits d37 and d38 which have not yet been eliminated, occurring respectively at digit times p1 and p2 of beat K.

The M4 waveform from gate N64, FIG. 3, remains "on" during the beat L/E to provide a further three right shifts of the product circulating in the "q" register thereby putting the assembled 38 least significant digits of the complete product, which this circulating number forms, into standard machine time. The two remaining multiplier digits d37 and d38 reach the upper entry gate of the delay Q63 at digit times p38 and p39 of beat K and are therefore deleted by the action of the T52 waveform which is "off" at these times. The product digits reach the output of the delay Q63 at digit times p0 . . . p37 of beat L/E. These are followed by gap or "0" value digits in digit times p38 . . . p41. The "0" value digit in times p38 forms a correct (positive) sign digit for this least significant half of the product. The M4 waveform goes "off" and the M5 waveform comes "on" again at the following digit time p41 which marks the commencement of the next beat following the multiplication order and as a result of this the normal 42 interval delay time of the circulation loop is restored and the least significant half product signal continues to circulate in synchronism with standard machine time.

The digits of the final partial sum appear at the output of the delay line P28 of the "p" register, FIG. 1b, at digit times p37 of beat K to p36 of beat L/E. The least significant two of these are shunted as described above to the "q" register by way of the delay P78 and bus-bar Y55 and the remainder form the most significant half of the final product. The most significant two digits d38, d39 of the signal emerging from the delay line P28 represent the sign and as described in the aforesaid reference C, these digits should be identical except in the special case of where overflow occurs (where $-1 \times -1 = +1$). The "multiply" right shift circulation in the "p" register is inhibited at the gate P57 as soon as the L waveform comes "on" and the normal circulation path through delay P78 and the upper entry gate of delay P75 becomes opened by the X59 waveform from inverter N85, FIG. 3, at the same time. The timing waveform T52 from inverter N02 ("on" during digit times p41 . . . p37) ensures that the third of the three least significant digits which would normally be erased and shunted to the "q" register is retained and also that the repeated sign digit occurring in digit time p38 is deleted. The eventual word signal emerging from this delay P75 appears between p0 and p38, i.e. at standard machine timing.

The equipment of the mill, shown in FIG. 2, is used to test for "overflow" during the beat L/E, such overflow test being as described in the aforesaid reference C. The normal circulation loop in the register "p" is tapped between the delays P78 and P75 and the signal in this register, i.e. the more significant half of the product containing the aforesaid sign digits d38, d39, is fed to the mill through delay P67 and busbar Y56 to the right-hand entry gate of delay M53 now opened by the L waveform. The output from this delay then proceeds by way of the left-hand entry gate of delay M63 and the left-hand entry gate of delay M83 to the busbar Y66 over which it proceeds to the lower entry gate of the delay B11 of the mill, FIG. 2. The word signal entering through delay B11 passes to the first input terminal 64 of the computing circuit CPC of the mill and eventually emerges in unaltered form, as there is no second input to such computing circuit, at the output terminal 66 whereafter it proceeds by way of delay line B55 and unit delay B56 to the serially connected unit delays B57 and B58 which respectively provide outputs for operating the overflow testing arrangements comprising delay B38, gate B39 and inverter B49 as described in the aforesaid reference C. As such overflow testing is not an essential part of the present invention, it will not be further described.

At the end of beat L/E, which marks the end of the multiplication order 20, the most significant half of the product signal is circulating within the "p" register with its sign digit d38 properly indicative of the sign of the complete double length product while the least significant half of such product signal, with its sign digit d38 positive, is circulating in the "q" register.

*Operation—Order 21*

Order 21 calls for the performance of the same function as order 20 coupled with rounding by adding a "1" at the 39th place of the eventual double length product number, i.e. at the more significant end of the less significant half product.

The cycle of operations for this order is substantially identical with that described above for order number 20 except for the fact that the rounding digit signal is initially inserted into the "p" register before commencement of the multiplication operation. This is effected by opening the upper entry gate of the delay P47, FIG. 1b, by the combined action of the 38, M3 and G11 (staticised F digits) waveforms to cause a pulse in digit time p38 to enter the circulation path around the register during the first or D beat of the particular A or B period concerned. By its timing this inserted "1" value digit pulse will arrive at the input to the computing circuit AS1 at digit time p40, i.e. before the commencement of possible in-flow of the multiplicand through delay P00 and will arrive at the second adding circuit ADR2 in digit time p41, again before the possible in-flow of the multiplicand signal through delay P03 and will eventually arrive at adding circuit ADR3 in digit time p0, again before the commencement of in-flow of the multiplicand signal through delay P06. This inserted digit signal then circulates again through delay P49, gate P57 and delay P51 to arrive back at the input terminal 50 of the computing circuit AS1 in the following digit time p37 of beat D+1. This is equivalent to digit time p39 for its arrival at the input terminal 56 of the adding circuit ADR3, at which time the version of the multiplicand signal $n$ being fed over busbar Y50 (which is two digit intervals late on standard time) presents its d37 digit. The action of this inserted "1" digit signal is thus the equivalent to the addition of "+½" at the time of forming the first partial product. Such addition may, of course, propagate a series of carry digits which will eventually pass over to the final most significant half of the product which is eventually held in this "p" register and hence effect the required round-off function.

*Operation—Order 22*

Order 22 calls for the performance of the same function as order 20 but with the additional proviso that the resultant product number shall be added to a double-length number already registered in the "p" and "q" registers at the beginning of the order. In this order the final L and E beats are consecutive so that a total of 16 beats is needed.

In this operation the cycle of events is similar to that for order 20 previously described inasmuch as the multiplicand number $n$ is first placed in the register constituted by the storage loop around delay line Q15, FIG. 1b, and the multiplier $x$ is fed into the "q" register, FIG. 1c, through delay Q23. Simultaneously, however, the contents of the "p" register, i.e. the most significant half of a double-length number already in existence, are fed into the mill 5, FIG. 2, while the contents of the "q" register, i.e. the least significant half of the existing double length number, are transferred to the "p" register. This is effected as follows.

In the initial D beat the lower entry gate of delay P47, FIG. 1b, is opened by the M3 waveform from delay N63, FIG. 3, and the G12 waveform (staticised F digits) and serves to connect the "p" register through busbar Y65 with the circulation loop of the "q" register, FIG. 1c, at the output from delay Q41. The "q" register signal at this point has a timing one digit interval late on standard time, i.e. its digits d0 . . . d37 (excluding the sign digit) appear at digit times p1 . . . p38. The entry gate of delay p47 is held open for the period from digit time p1 until digit time p40 of beat D wherby the signal content of the "q" register flows over busbar Y65 into the "p" register. Simultaneously, the right-hand entry gate of delay M53, FIG. 3, is opened by the U50 waveform from delay N20, FIG. 3, to permit signals already in the "p" register to flow out over busbar Y56 through delays M53, M63 (now opened by the M2 waveform from gate N62, FIG. 3) and M83 to busbar Y66 and so to the entry gate B11 of the mill, FIG. 2. The timing of the "p" register signals at the output of delay P67 is at standard machine time and its sign digit d38 is repeated in digit position d39 by the action of the sign repeater circuit of delay M53.

The normal circulation paths of both "p" and "q" registers are broken by the "off" state of the X58 waveform at delays P61 and Q44 as explained in connection with order 20 so as to erase such numbers from the registers themselves. The original most significant half of the existing number now transferred from the "p" register to the mill with its sign digit repeated proceeds to circulate around the mill over the 42 digit interval circulation path provided by way of computing circuit CPC, delay line B55, delays B56, B57, B58, B79, B89 and B62, its digits d0 . . . d39 having the timing at the input terminal 65 of the computing circuit CPC of p4 to the following-digit time p1. Such number signal is retained with unchanged timing relationship to the machine rhythm until the next to last beat L.

A series of intermediate beats now take place in which multiplication is effected in three-digit steps as already explained in connection with order 20, the least significant half of the existing number content of the "q" register, now in the "p" register, circulating and being effectively added in to the partial sum signals which are being provided at each beat by the output from circuit ADR3. In the manner already explained the three least significant digits of each partial sum are transferred at each beat into the "q" register behind the progressively decreasing number of digits of the multiplier $x$ which are being held in that register. In beat K the last three digits of the multiplier are dealt with as already explained in connection with order 20, the sign digit d38 being interpreted negatively as before. In this particular order the last two beats L and E are separate and consecutive instead of coincident as with orders 20 and 21. This modification of the beat control is effected by the inhibition of the left-hand entry gate of delay M77, FIG. 3, by the suppression of the output from inverter M67 due to the continued "on" state of the M2 waveform from gate N62 and the consequent need to await the arrival of the L waveform at the right-hand entry gate of the delay M77 to provide the necessary output pulse in waveform X63 for application to the beat counter arrangements shown in FIG. 6 to cause the triggering "on" of the trigger circuit around delay J134 and the subsequent initiation of the final E beat.

During this L beat the most significant half of the product number now assembled in the "p" register, FIG. 1b, cannot circulate either by way of the normal length path through delay P75 (waveform X59 is now "off") or by the 39 digit delay path through gate P57 (waveform ~L is "off"). Instead it is fed out through delay P67, busbar Y56, delays M53, M63 and M83 to busbar Y65 and so to the entry gate B11 of the mill, FIG. 2. From this point it passes to the input terminal 64 of the computing circuit CPC with a similar timing to that of the existing content of the mill, namely, the most significant half of the number originally existing in the "p" and "q" registers which passes to the opposite input terminal 65 of the computing circuit CPC. The arriving signal from the "p" register has already had its sign digit d38 repeated into digit position d39 while the circuit CPC is continuously set to effect addition for all orders in the group 20 . . . 27 by the "on" state of the output from inverter B101. Thus, the most significant half of the product number is added to the most significant half of the original number so as to obtain the correct answer number. This is sensed for overflow, as described in connection with order 20, in the arrangements of the overflow register comprising delay B38. This corrected most significant half of the answer number is then fed back to the "p" register during the succeeding and final E beat by way of the output busbar Y2 from the mill to delay P95 of the "p" register now opened by the M2 and U54 waveforms derived respectively from gate N62 and gate N24, FIG. 8. The U54 waveform is "on" during the period of digit time p41 to the following digit time p37. As the arriving digits have the timing of d0 . . . d39 in digit times p41 . . . p38, the second sign digit d39 is automatically erased. Continued circulation in the mill is inhibited by the ~E waveform at delay B79.

The most significant half of the answer number is accordingly now located in the "p" register and the least significant half of such number in the "q" register.

*Operation—Division*

The arrangements for effecting division operate under the so-called "non-restoring" method by which, at each of a succession of steps, the divisor is either subtracted from or added to the remainder (which term includes, of course, the dividend at the first step) according to whether the respective signs of the divisor and such remainder are the same or different, a "1" being added to the quotient when the signs are the same and a "1" being subtracted from the quotient when the signs are different, both the quotient and the remainder being effectively doubled after each step. In this method, if a zero remainder occurs at any time, it must be treated as if its sign is the same as that of the divisor and in order to avoid an error which can arise if the divisor is negative, since the respective sign digits will then differ, special arrangements are provided for continuously testing the remainder for zero value and then taking appropriate action to achieve this result.

In the arrangements of this machine the dividend comprises either a double length number of which the signal representing its least significant part is already located in the "q" register and the signal representing its most significant part is derived from a computing store register defined by the X digits of the order and is fed initially into the "p" register or a single word length number which is likewise derived from a computing store register defined by the X digits of the order. The divisor number signal is derived from a computing store register defined by the N digits of the order and is held in the word register around delay line Q15. The final quotient representing signal is eventually located entirely in the "q" register and the signal representing the remainder, if any, is eventually located entirely in the "p" register.

The operative period during which division is performed is basically similar to that of multiplication except that it has a larger number of intermediate beats between the initial D beat and the final K and L beats, the latter coinciding with the final E beat of the period. The number of intermediate beats is determined by the number of digits in the divisor and in the present machine is 40. The total number of beats is therefore 43. During each intermediate beat a right shift by one digit place is effected in both the "p" and "q" registers, the most significant digit of the dividend number part in the "q" register, where a double length dividend is used, being transferred during each step to the lowest significant end of the dividend or remainder number part in the "p" register and the quotient digit which is formed at the same time being fed into the "q" register, occupying a place previously made vacant by such transfers where such "q" registers is also in use to register the lower significant half of a double length dividend.

The manner in which division operations are performed will be made more clear from the following more detailed treatment of the three division orders.

Operation—Order 24

Order 24 calls for the unrounded division of a double length number $x + 2^{-38}q$ by a single word length number $n$.

In order to clarify the subsequent description a simple example (employing only four positive value digits in each single word-length number) will first be given. In this example $$\text{decimal } \frac{177}{256} \text{ (binary 0.10110001)}$$

will be divided by $$\text{decimal } \frac{13}{16} \text{ (binary 0.1101)}$$

By longhand division:

```
              0.1101 = Quotient
0.1101/0.10110001
       1101
       ‾‾‾‾
       10010
        1101
        ‾‾‾‾
        010101
          1101
          ‾‾‾‾
          1000 = Remainder
```

By computer:

Most significant half-dividend $x = 0.1011$
Least significant half-dividend $q = 0.0001$
Divisor $n = 0.1101$ In the following table the symbol o indicates a gap digit while in register "q" column "t" denotes the position when digit signals are transferred to the "p" register.

| Beat | Register "p" | | Register "q" | | t |
|---|---|---|---|---|---|
| D | | | Dividend q | | 00000100 |
|   | | | add guard digit | | 1 |
| D+1 | Dividend x | ooo01011 | Shift q | | 00000101 |
|   | Signs alike—subtract n | 00001101 | add 1 | | 00001010 |
|   | | | | | 1 |
| D+2 | Remainder x1 | 00011110 | | | 00001011 |
|   | Shift x1 and include t | 00111100 | Shift q; trans. t | | 0001o110 |
|   | Signs unlike—add n | 00001101 | subtract 1 | | 1 |
| D+3 | Remainder x2 | 00001001 | | | 0001o101 |
|   | Shift x2 and include t | 00010000 | Shift q; trans. t | | 0010o1010 |
|   | Signs alike subtract n | 00001101 | add 1 | | 1 |
| D+4 | Remainder x3 | 00000101 | | | 00101011 |
|   | Shift x3 and include t | 00001010 | Shift q; trans. t | | 01o10110 |
|   | Signs alike-subtract n | 00001101 | add 1 | | 1 |
| D+5 | Remainder x4 | 00111101 | | | 01010111 |
|   | Shift x4 and include t | 00111011 | Shift q; trans. t | | 00101110 |
|   | Signs unlike—add n | 01101 | subtract 1 | | 1 |
| D+6 | Remainder x5 | 00001000 | | | 00101101 |
|   | Shift x5 | 00010000 | Shift q | | 0101110 |
|   | Signs alike—subtract n | 00001101 | add 1 | | 1 |
| K | Remainder x6 | 00000011 | No shift but | | 01011011 |
|   | No shift but add n | 1101 | subtract 1. | | 1 |
| L/E | | 00010000 | Eliminate surplus | | 01011010 |
|   | Right shift 1 place and eliminate surplus digits = remainder. | 00001000 | digits = quotient. | | 00011010 |

In consequence of the F digit combination, F waveforms, ~F0, F1, ~F2, F3, ~F4 and ~F5 will be "on" as well as G waveforms G02 and G14.

In the initial D beat of the operative (A or B) order period, the X58 waveform operates to clear the register of delay line Q15, FIG. 1b, as before while the left-hand entry gate of this delay line is opened to allow the entry into the storage loop around such delay line of the divisor number signal arriving over busbar Y40 (with a timing one digit time late on standard machine time) from that one of the computing store registers (e.g. register 64) which is defined by the N digits of the order. At the same time, another version of this divisor number signal on busbar Y40, delayed by one further digit interval due to its passage through the sign repeater circuit of delay V54, FIG. 1a, is applied over busbar Y41 to the left-hand entry gate of delay M17, FIG. 3, which delay is arranged as a trigger circuit which is set "on" at digit time p40 of this beat D if the sign digit d38 of the divisor number n is "1" (i.e. negative) but which remains "off" if the divisor is positive. The setting of this trigger circuit, which forms a record of the sign of the divisor, is held until the next D beat, i.e. until after completion of the division operation.

In the same D beat the "p" register is cleared of any previous content by the action of the X58 waveform at the normal circulation delay P61 while the right-hand entry gate of delay P43 in the "p" register, FIG. 1b, is opened by the D and Q1 waveforms to allow the admission over busbar Y48 of the most significant half of the dividend number signal x from that one of the accumulator registers (e.g. accumulator register 2) of the computing store which is defined by the X digits of the order. The timing of this signal on busbar Y48 is one digit time late on standard machine time and the arrangements of each delay P43 including its feedback loop to its left-hand entry gate controlled by the ~39 and T51 waveforms operate to provide two copies of the sign digit d38 of this number signal x in digit positions d39 and d40. This number then flows into the "p" register and commences to circulate through the adding circuit ADR2, by way of its input terminal 53, adding circuit ADR3 with its delay line P28 and thence through delay P49, delay P78, delay P67, the lower entry gate of delay P65 and thence to gate P82, delay P71 and the lower entry gate of delay P61 (now open again as the D beat period is over) and so to the input terminal 50 of the computing circuit AS1 and thence through mixer P34 to the adding circuit ADR2 and so on. This path has a total delay time of 43 digit intervals whereby there is a left shift by one place at each circulation.

The "q" register, FIG. 1c, which already contains the least significant half of the dividend number is also caused to have a 43 digit interval delay path from delay Q63, through gate Q61, delays Q41, Q33, Q34 and Q46 to delay line Q49 and thence to delays Q68, Q66 and Q65.

At digit time p40 of beat D, the lower entry gate of delay P85 of the "p" register, FIG. 1b, is opened by the Q2 and 40 waveforms to admit, over busbar Y60, one digit signal from the output point of delay Q34 of the "q" register, FIG. 1c. The timing of the signal circulating in the "q" register is such that this digit is the most significant positive digit d37 of the least significant part of the dividend number. This transferred digit d37 is, in a later beat, erased from the "q" register by the ~39 waveform at the lower entry gate of delay Q63.

During this same D beat the lower entry gate of delay M24, FIG. 3, is opened by the ~40, D and Q1 waveforms except during digit time p40 to allow the entry of a series of pulses in digit times p1-p39. This series of 39 digit pulses commences to circulate around the storage loop including the delay line M04 in similar manner to that already described in connection with the multiplication orders and operates, as with those orders, to count the number of intermediate beats prior to the eventual setting of the trigger circuit of delay M51 to produce the K waveform defining the K beat. In addition, this series of circulating pulses, which gradually reduce in number one in each beat as already explained, is used to control an arrangement including delay M36 which continually tests for zero remainder in the representative signals circulating in the "p" and "q" registers.

Delay M36 is connected as a trigger circuit which can be set "on" (under the control of the ~2 and U53 waveforms from inverter N23, FIG. 3) by any "1" digit signal arriving at its lower entry gate over busbar Y53 from the output of the delay P25, FIG. 1b, of the adding circuit ADR2 of the "p" register or, through its upper entry gate, by the coincidence of any "1" digit signals arriving over the aforesaid busbar Y60 from the "q" register, FIG. 1c, with one of the pulses (progressively decreasing in number) of the counting train circulating within the storage loop including delay line M04. By their timing, such counting chain pulses serve as a gate control medium for selectively examining only those signals on the Y60 busbar which form that gradually decreasing part of the contents of the "q" register which represents the lower significant portion of the original dividend number, not yet included in the partial remainder. The trigger circuit around delay M36 is set "off" at digit time p2 of each beat by the ~2 waveform. Accordingly, it will fail to be set "on" again if the more significant part of the remainder number which is circulating in the "p" register and that part, so far unused, of the original dividend number which is still circulating in the "q" register, are each of zero value.

The mixer M27, inverter M28 and gate M37, FIG. 3, constitute a form of "not-equivalent" detecting circuit whereby the sign of the divisor number, continuously indicated as already explained by the "on" or "off" state of the trigger circuit around delay M17, is compared in each beat with the sign digit of the remainder number circulating in the "p" register and delivered to mixer M27 and inverter M28 by way of busbar Y52 from the output of delay P25 of the adding circuit ADR2. Thus, if at digit time p1, the arriving sign digit signal is of value "1" (negative sign) and the trigger circuit of delay M17 is set "on" (negative sign) mixer M27 will provide an output to gate M37 but inverter M28 will be inhibited. Conversely, if the trigger circuit of delay M17 is "off" (positive sign) both mixer M27 and inverter M28 will provide an output to gate M37. In the opposite cases where the arriving sign digit signal is of value "0" (positive sign) inverter M28 will always provide an output but mixer M27 will fail to provide an output if the trigger circuit of delay M17 is "off" but will do so when the latter is "on." Thus, whenever the compared sign values are alike, gate M37 is held closed at digit time p1 and, in consequence, the trigger around delay M48 is not set "on." The Q4 waveform is therefore "off" and the Q5 waveform is "on." If the compared sign digits differ, then providing the zero detector trigger circuit of delay M36 is "on," the gate M37 will provide an "on" output at digit time p1 whereby the Q4 waveform is set "on" from digit time p2 until the next following digit time p0 and the Q5 waveform goes "off" for the same period. When, however, the zero detector of delay M36 fails to be set "on" as described above, then gate M37 remains closed, regardless of the result of sign digit comparison and the Q4 waveform is forced into the "off" state and the Q5 waveform into the "on" state.

The inverter Q37, delay Q38 and delay line Q49 of the "q" register, FIG. 1c, form a half adder/subtractor which is controlled by the Q5 and Q4 waveforms in the opposite sense to that of the computing circuit AS1 of the "p" register, FIG. 1b, whereby the half adder/subtractor circuit effects addition when the Q5 waveform is "on" and subtraction when the Q4 waveform is "on." In each beat a single digit pulse is supplied to this add/subtract circuit by the Q3 waveform derived from the delay N84, FIG. 3, which delay serves to release the digit pulse of the 1 waveform in every beat of a division operation except the final E beat. This digit pulse accordingly arrives at the half adder/subtractor circuit in digit time p2 of each beat and will be either added to or subtracted from the number train entering the half adder/subtractor circuit through delay Q46. These applied digits of the Q3 waveform form the eventual quotient number.

In the aforesaid first beat D the Q4 waveform from delay M48, FIG. 3, is "off" and the Q5 waveform "on" as there is, as yet, no output from delay M17 (this is not set until digit time p40) and the input on busbar Y52 from the "p" register, FIG. 1b, at the testing time of digit time p1, is zero since this instant coincides with a gap digit of the number circulating in the "p" register. In consequence the computing circuit AS1 of the "p" register, FIG. 1b, is set to effect subtraction and the half adder/subtractor circuit Q37, Q38, Q49 of the "q" register, FIG. 1c, is set to effect addition. This results in the arriving "1" digit (in time p2) of the Q3 waveform at delay Q38 and inverter Q37, FIG. 1c, being put into the "q" register in a position which is ultimately one position more significant than the sign digit of the eventual quotient. That is to say, it eventually will be in the position of digit $d39$. Such position is effectively two positions below or to the left of the least significant positive digit of the original number (the least significant half of the dividend) already in the "q" register. This inserted digit forms a so-called "guard" digit to prevent any later subtraction from carrying into the least significant part of the dividend. It is also used to indicate overflow on division.

The first test of the respective signs of the dividend and divisor number signals is made in digit time p1 of the first intermediate beat $D+1$. If the test at delay M17, mixer M27 and inverter M28, FIG. 3, indicates like sign, then the trigger circuit of delay M48 is not set "on" with the result that the Q4 waveform remains "off" and the Q5 waveform remains "on" whereby the computing circuit AS1, FIG. 1b, is again caused to effect subtraction, this time subtracting the divisor number signal emerging from delay line Q15 over busbar Y50 and through the upper entry gate of delay P00 to input terminal 51 from the most significant part of the dividend signal circulating around the "p" register and at this time entering input terminal 50. At the same time the half adder/subtractor of elements Q37, Q38, Q49 of the "q" register, FIG. 1c, is caused to add the arriving single digit pulse of the Q3 waveform to the number signal train circulating around the "q" register. Conversely, if the above test indicates unlike sign, then the Q4 waveform is "on" whereby the circuit AS1 adds and the circuit Q37, Q38, Q49 subtracts. The first digit of the quotient (the sign digit $d38$) which is thus formed by the Q3 waveform pulse is inserted in the "q" register in digit time p2, one place below (i.e. less significant than) the aforesaid "guard" digit. Both the "p" and "q" registers are, of course, now shifting by one place to the right in each beat.

The above described cycle is repeated 39 further times in intermediate beats $D+2 \ldots D+40$ until the last (Q3 waveform) digit inserted into the quotient at the half adder/subtractor of the "q" register is one place below ($d41$) the least significant digit ($d0$) of the quotient. By this time, the inserted 39 digit pulses circulating around the storage loop of delay line M04 have all been erased and the next beat is accordingly the K beat. At this time the Q2 waveform from gate N82 goes "off." This brings the X60 waveform from inverter N86, FIG. 3, "on." In consequence the lower entry gate of delay P65 is closed and the lower entry gate of delay P75, FIG. 1b, is opened while in the "q" register the lower entry gate of delay Q33 is closed and the upper entry gate of delay Q44 is opened so that each register now has a 42 interval circulation path and there is no shifting in either of the registers during this beat.

As the quotient is formed by adding or subtracting a "1" in the least significant position always occupied by a "0," the last digit of the quotient is always "1." Moreover, although the last digit at any stage may itself be altered by the next following stage (if this involves subtracting a "1") all the remaining digits will be unaltered. Thus, at the beginning of beat K all of the 39 digits of the unrounded quotient are correct and are followed by an additional "1."

The Q4 waveform is forced to be "on" in beat K by reason of the input through the right-hand entry gate of delay M38, FIG. 3, which is controlled by the K and G14 (staticised F digit) waveforms. In consequence the add/subtract circuit AS1 of the "p" register is set to add whereas the half adder/subtractor Q37, Q38 of the "q" register is set to subtract. There is no shift of either the "p" or "q" register numbers during this beat so that the "1" pulse of the Q3 waveform arriving at the half adder/subtractor Q37, Q38, Q49, FIG. 1c, is subtracted from the quotient signal in the same digit position as the final "1" digit which was inserted at the previous step, i.e. 1 position below the least significant digit of the quotient. This leaves the quotient exactly the required number except for the unwanted "guard" digit. At the same time the divisor number is added, at the computing circuit AS1 of the "p" register, into the (unshifted) remainder number circulating in that register. This keeps the remainder in the "p" register arithmetically in step with the quotient in "q" so that it is the desired final remainder.

In the final L/E beat, the circulation path of the "p" register is altered from its normal delay time of 42 digit intervals to one of 41 digit intervals thereby to provide a right shift of one place. This is necessary in order to bring the timing of the remainder number signal into synchronism with standard machine time and is effected by the closure of the normal circulation path at the lower entry gate of delay P75 by the "off" state of the K waveform and the opening of an alternative path through the upper entry gate of delay P85 by the U54 waveform from gate N24, FIG. 3. This gate is controlled by the T52 waveform from inverter N02, FIG. 3, and as this latter waveform is "off" at digit times p38, p39 and p40, the aforesaid entry gate of delay P85 is closed at these times. As the circulating signal is one digit early at this point, such gate closure effectively clears any signal content of digit positions $d39$, $d40$ and $d41$ of the circulating signal.

In the "q" register, the timing of the circulating quotient signal is already in agreement with standard machine time and no alteration of the circulation time is necessary.

*Operation—Order 25*

Order 25 calls for the rounded division of a double length number $x+2^{-38} q$ by a single length number $n$. The relevant F waveforms which are "on" will be ~F0, F1, ~F2, F3, ~F4, F5 while the G02 and G15 waveforms will be "on" also.

With this order exactly the same cycle of events occurs except that at the time of beat K the Q4 waveform, instead of being forced "on" as described above, is set normally as if for the next digit of the unrounded quotient. This arises by reason of the G14 waveform at the right-hand entry gate of delay M38 being "off."

If the digit in the infinite unrounded quotient next below the least significant digit required is a "1," the Q4 waveform will be set "off" so that the half adder/subtractor circuit of Q37, Q38 and Q49 is caused to add the applied Q3 waveform pulse in this case where the need is to round-up and increase by "1" the value of the last digit to be kept in the quotient. As the signal in the "q" register has not shifted in beat K, the normal process will add another "1" to the one already in the position which is one below the last digit which is to be kept of the quotient and the resulting addition operation, with its accompanying carry-digit propagation, will produce the rounded quotient with a zero next below the least significant digit. The corresponding operation to subtract the divisor from the remainder will be carried out in the "p" register so that this "p" register finally holds the arithmetically correct remainder.

If the digit in the infinite unrounded quotient next below the last required is a "0," the normal setting of the Q4 waveform at the beginning of beat K will be that of Q4 "on" so that the half adder/subtractor of Q37, Q38 and Q49 of the "q" register, FIG. 1c, will subtract the applied Q3 waveform pulse. In this case the rounded and unrounded quotients are the same and exactly the same process is used.

The operation in beat L/E is as described for order 24.

Operation—Order 26

Order 26 calls for the rounded division of a single length number $x$ by a single length number $n$. The relevant F waveforms which are "on" will be ~F0, F1, ~F2, F3, F4 and ~F5 while waveforms G02 and C16 will also be "on."

The cycle of events with this order is identical with that of order 25 except that in the first beat D the circulation loop path, although shifted to one through delay Q33 in order to provide a 43 interval delay time as before, remains broken at the lower entry gate of this delay due to the "on" state of the F4 waveform applied to inverter N151, FIG. 3, causing the U151 waveform to be "off" for the duration of the beat. This clears the "q" register with the result that in the subsequent intermediate beats $D+1 \ldots D+40$ no "1" value digit signals are available for transfer to the "p" register.

In each of the above orders, test for "overflow" (as dealt with in greater detail in the aforesaid reference C) is effected. Thus, in the final beat L/E at digit time $p37$, the test or guard digit of the Q3 waveform initially inserted into the "q" register in beat D through the half adder/subtractor of Q37, Q38 and the next less significant digit (the sign digit $d38$ of the quotient) are present respectively at the outputs Y62, Y61 and Y64, Y63 of unit delays Q66 and Q65, FIG. 1c. These two digits are tested for equivalence in the circuit of inverter M54, gate M66 and gate M75, FIG. 3. If they are both of the same value, overflow has occurred and gate M75 will provide an output for actuating the "overflow" indicating means such as lamp L1, FIG. 3. The waveform Y67 from delay M86 also sets the overflow trigger circuit of delay B38, FIG. 2, to bring the OVR waveform "on."

Overflow can arise under several conditions during division including the case where the dividend is greater than the divisor thereby making the quotient value greater than 1 and accordingly out of range of the machine number signal.

While the invention has been described by way of example with reference to a specific practical embodiment it will be obvious that many changes and modifications may be made without departing from the scope of the invention as defined in the following claims. For example, the various storage registers used may be of some other type than that employing a magnetostrictive delay line; for instance a continuous stepping register embodying a plurality of thermionic valve or magnetic storage core stages could be used.

I claim:

1. In an electronic binary digital computing machine adapted to operate in the series mode with number words in the form of electric pulse signal trains including a sign-indicating signal, a multiplier/divider comprising first and second word storage registers each of a kind embodying a word signal circulation loop having a delay time one digit time longer than the word signalling time and each being provided with a signal-controlled arithmetical circuit included in such circulation loop, each of said arithmetical circuits of said first and second register including means for adding and directly subtracting, by which either addition or subtraction of an external number signal to or from the number signal circulating in said loop may be made, a source of number signals representing an operand, said signals being repeated at word time intervals and being arranged for application to said arithmetical circuit of said first register, means for comparing the respective values of the sign-indicating signals of said operand signal and said number signal circulating in said first storage register, a source of digit signals occurring one in each word time and arranged for application to said arithmetical circuit of said second register and means operated by said sign comparing means for controlling said arithmetical circuits whereby said arithmetical circuit of said first register adds and said arithmetical circuit of said second register substracts when said compared sign indicating signals are not alike and conversely when said compared sign indicating signals are alike.

2. An arrangement according to claim 1 which includes means for suppressing the most significant digit of said number signal circulating in said first register at each successive word time and a transfer circuit for transferring from said second register to said first register at each successive word time a digit signal of next lower significance than the lowest significant digit signal of said number signal circulating in said first register.

3. An arrangement according to claim 1 wherein said operand is a divisor and said number signal circulating in said first storage register is a remainder and which includes means for continuously testing said number signal circulating in said first register for zero value and means controlled by such testing means for overriding said sign-comparing means when said tested signal is of zero value and providing a control for said arithmetical circuits equivalent to the presence of like sign-indicating signals in said divisor and remainder number signals.

4. An arrangement according to claim 1 wherein the number signal circulating in the operative circulation loop of said second storage register is a multiplier signal and in which each of said first and second registers is provided with signal-controlled means for altering the delay time of their respective circulation loops between values which are equal to, greater than and less than the normal word time of said number words.

5. An arrangement according to claim 4 which includes means for examining the value of at least the least significant digit of said multiplier number signal circulating in the operative circulation loop of said second register, said operative loop having a delay time less than said word time, gate circuit means in a signal transmission path between a source of number signals representing the multiplicand and said signal controlled arithmetical circuit of said first register, said multiplicand signals being repeated at word time intervals and multiplier control means operated by said digit value examining means at each circulation of said registers to render said gate circuit means conductive when said examined digit is of value "1" and non-conductive when said examined digit is of value "0," said arithmetical circuit of said first register being controlled to effect addition except when said examined multiplier digit is said sign indicating signal.

6. An arrangement according to claim 5 in which said circulation loop of said first register includes a plurality $n$ of serially interconnected adding circuits, at least the first of which is signal-controlled to be capable of effecting subtraction instead of addition, said circulation loops of each of said registers having a total delay time $n$ digit times less than a normal word time and each of said adding circuits accounting for one digit time delay in $n$ sequential delay steps in said first register, said signal digit examining means being arranged separately to examine each of the $n$ least significant digits of said multiplier signal circulating in said second register, said source of multiplicand signals being connected to each of said adding circuits through signal transmission paths each including a separate gate circuit means and said multiplier control means being arranged to control the gate circuit means of the transmission path to the $n$th adding circuit in accordance with the value of the least significant examined digit, to control the gate circuit means of the transmission path to the $n-1$th adding circuit in accordance with the value of the next-to-least significant examined digit and so on.

7. An arrangement according to claim 6 which includes means for suppressing said examined digit signal or signals after examination and a transfer circuit for transferring from said first register to said second register at each successive word time the least significant digit or the n least significant digits of the partial sum signal circulating in said first register.

8. An arrangement according to claim 1 in which said source of operand signals comprises a third word storage register of the kind embodying a word signal circulation loop.

9. An arrangement according to claim 2 wherein said operand is a divisor and said number signal circulating in said first register is a remainder and which includes means for continuously testing said number signal circulating in said first register for zero value and means controlled by such testing means for overriding said sign-comparing means when said tested signal is of zero value and providing a control for said arithmetical circuits equivalent to the presence of like sign-indicating signals in said divisor and remainder number signals.

10. In an electronic binary digital computing machine adapted to operate in the series mode with number words in the form of electric pulse signal trains including a sign-indicating signal, an apparatus arrangement for carrying out the process of division comprising a first single word storage register of a kind embodying a word signal circulation loop, said loop having a delay time one digit time longer than the word signalling time and including a first signal-controlled convertible arithmetical circuit having means for performing the functions of addition and direct subtraction, said means having an external signal input and controllable by a first state control signal to effect addition of a number signal applied to said external signal input to the number signal circulating in said loop or by a second state control signal to effect direct subtraction of a number signal applied to said external signal input from the number signal circulating in said loop, a second single word storage register of a kind embodying a word signal circulation loop, said loop having a delay time one digit time longer than the word signalling time and being provided with a second signal-controlled convertible arithmetical circuit having means for performing the functions of addition and direct subtraction, said means having an external signal input and controllable by a first state control signal to effect direct subtraction of a number signal applied to said external signal input from the number signal circulating in said loop or by a second state control signal to effect addition of a number signal applied to said external signal input to the number signal circulating in said loop, a source of number signals representing the divisior number, said signals being repeated at word time intervals, circuit means for applying the divisor signals from said source to said external signal input of said first convertible arithmetical circuits, a source of digit signals occurring one at each word time, circuit means for applying said digit signals from said source to the external signal input of said second convertible arithmetical circuit, means for repeatedly comparing the respective values of the sign-indicating signals of said divisor number signals and said number signals circulating in said first storage register, and means for deriving from said sign comparing means a first state control signal for said convertible arithmetical circuits when said compared sign-indicating signals are not alike and a second state control signal when said compared sign-indicating signals are alike.

11. An arrangement according to claim 10 which includes means for continuously testing said number signal circulating in said first storage register for zero value and means for overriding said sign-comparing means to force said control signal deriving means to provide a second state control signal when said testing means detect a zero value number signal.

12. An arrangement according to claim 10 in which each of said first and second word storage registers include a delay device of one digit time delay value and by-pass circuit means including signal-controlled gate means for shunting said delay device in said circulation loop whereby each of said circulation loops may be made to have a delay time value which is equal to the normal word signalling time.

13. An arrangement according to claim 12 in which each of said first and second word storage registers includes a second delay device of one digit time delay value and second by-pass circuit means including signal-controlled gate circuit means for shunting said second delay device in said circulation loop whereby each of said circulation loops may be caused to have a delay time less than the normal word signalling time.

14. An arrangement according to claim 10 which includes means for suppressing the most significant digit of said number signal circulating in said first register at each successive word time and a transfer circuit for transferring from said second register to said first register at each successive word time a digit signal of next lower significance than the lowest significant digit signal of said number signal circulating in said first register.

References Cited in the file of this patent

UNITED STATES PATENTS

| | | |
|---|---|---|
| 2,701,095 | Stibitz | Feb. 1, 1955 |
| 2,776,794 | Williams et al. | Jan. 8, 1957 |
| 2,846,142 | Strachey et al. | Aug. 5, 1958 |
| 2,928,850 | Richards | Mar. 1, 1960 |
| 2,936,116 | Adamson et al. | May 10, 1960 |

FOREIGN PATENTS

| | | |
|---|---|---|
| 1,056,750 | France | Oct. 21, 1953 |
| 526,058 | Belgium | Feb. 15, 1954 |
| 736,144 | Great Britain | Sept. 7, 1955 |
| 167,102 | Australia | Feb. 27, 1956 |

OTHER REFERENCES

ERA-High-Speed Computing Devices, McGraw-Hill Book Co. Inc., New York, Copyright 1950.

Robinson: Multiplication In The Manchester Univ. High-Speed Digital Computer, Electronic Engineering, January 1953.